United States Patent
McIntosh et al.

(10) Patent No.: US 6,535,732 B1
(45) Date of Patent: *Mar. 18, 2003

(54) CELLULAR NETWORK HAVING A CONCENTRATED BASE TRANSCEIVER STATION AND A PLURALITY OF REMOTE TRANSCEIVERS

(75) Inventors: Chris P. McIntosh, Palo Alto, CA (US); Priscilla M. Lu, San Carlos, CA (US); Ronald S. Ogaz, Los Altos, CA (US)

(73) Assignee: interWAVE Communications International, Ltd., Hamilton (BM)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/295,058

(22) Filed: Apr. 20, 1999

Related U.S. Application Data

(63) Continuation-in-part of application No. 08/914,983, filed on Aug. 20, 1997, now Pat. No. 6,101,400, and a continuation-in-part of application No. 09/049,606, filed on Mar. 27, 1998, now Pat. No. 6,173,177, which is a continuation of application No. 08/434,598, filed on May 4, 1995, now Pat. No. 5,734,979.

(51) Int. Cl.[7] ................................................ H04Q 7/20
(52) U.S. Cl. ..................... 455/422; 455/560; 455/562
(58) Field of Search ........................ 455/423, 424, 455/453, 524, 525, 560, 561, 562, 422, 446

(56) References Cited

U.S. PATENT DOCUMENTS

| | | | |
|---|---|---|---|
| 5,289,525 A | | 2/1994 | Issenmann et al. ............ 379/58 |
| 5,321,690 A | * | 6/1994 | Sato ........................... 455/56.1 |
| 5,471,644 A | | 11/1995 | Schatz et al. ............... 455/33.2 |
| 5,471,649 A | * | 11/1995 | Rees et al. .................. 455/67.4 |
| 5,555,260 A | * | 9/1996 | Rinnback et al. .............. 455/72 |
| 5,734,979 A | * | 3/1998 | Lu et al. ...................... 455/560 |
| 5,758,257 A | * | 5/1998 | Lee et al. .................... 455/562 |
| 5,761,195 A | | 6/1998 | Lu et al. ...................... 370/329 |
| 5,771,275 A | | 6/1998 | Brunner et al. ................ 379/67 |
| 5,796,722 A | * | 8/1998 | Kotzin et al. ................ 455/453 |
| 5,970,406 A | * | 10/1999 | Komara ...................... 455/422 |
| 6,058,317 A | * | 5/2000 | Posti ........................... 455/561 |
| 6,088,587 A | * | 7/2000 | Abbadessa ................... 455/562 |

* cited by examiner

*Primary Examiner*—Lester G. Kincaid
(74) *Attorney, Agent, or Firm*—Dorsey & Whitney LLP

(57) ABSTRACT

A cellular network for providing wireless communication with a plurality of mobile stations includes a mobile switching center having a public interface configured to communicate with a public switched telephone network and at least one private interface configured to communicate with a private network, the mobile switching center configured to route calls from the public network to the private network and from the private network to the public network. A base station controller is coupled to the mobile switching center private interface and configured to communicate with the mobile switching center. A concentrated base transceiver station is coupled to the base station controller and configured to communicate with the base station controller. A plurality of remote transceivers are coupled to the concentrated base transceiver station and configured to communicate with the concentrated base transceiver station and configured to communicate with mobile stations.

24 Claims, 20 Drawing Sheets

| CBTS | BSC | CBTS/BSC | MSC | BSC/MSC | CBTS/BSC/MSC |
|---|---|---|---|---|---|
| 3 CTRX | 0 CTRX | 2 CTRX | 0 CTRX | 0 CTRX | 2 CTRX |
| 1 TM | 6 TM | 2 TM | 6 TM | 6 TM | 2 TM |
| 1 CPU | 3 CPU | 2 CPU | 3 CPU | 3 CPU | 2 CPU |
| 1 Clk | 1 Clk | 1 Clk | 1 Clk | 1 Clk | 1 Clk |
| 1 RF Dist | | 1 RF Dist | | | 1 RF Dist |

FIG. 14

CELLULAR NETWORK HAVING A CONCENTRATED BASE TRANSCEIVER STATION AND A PLURALITY OF REMOTE TRANSCEIVERS

REFERENCE TO RELATED APPLICATIONS

This is a continuation-in-part of application Ser. No. 08/914,983, filed Aug. 20, 1997, now U.S. Pat. No. 6,101,400, and of application Ser. No. 09/049,606, filed Mar. 27, 1998, now U.S. Pat. No. 6,173,177, which is a continuation of application Ser. No. 08/434,598, filled May 4, 1995, now of U.S. Pat. No. 5,734,979, all of which are incorporated herein by reference. This application incorporated U.S. Pat. No. 5,842,138 by reference. filed Aug. 20, 1997, all incorporated herein by reference.

FIELD

The present invention relates to a cellular network communication system. In particular, the invention provides a cellular network communication system that economically services a plurality of microcells using distributed remote transceivers that also provides flexible scaling of the network capacity based on user demand.

BACKGROUND

Cellular communication systems are well known in the art. In a typical cellular system, a plurality of base transceiver stations (BTS) are deployed at a plurality of remote locations to provide wireless telephone coverage. Each BTS serves a corresponding cell and when a mobile station (MS) enters the cell, the BTS communicates with the MS. Coverage over a large area is achieved by placing a plurality of BTSs on the area. A conventional cellular network of this type is described in D. M. Balston & R. C. V. Macario *Cellular Radio Systems*, (Artech House 1993).

One drawback to the conventional cellular network is that each BTS represents a significant amount of hardware. For example, each conventional BTS includes a plurality of antennas, a plurality of transceivers, a plurality of signal processors, a central processor and an interface processor. With all this hardware, each BTS also represents a significant cost. Moreover, since the antennas are often placed outside such as on top of buildings or in other locations experiencing weather elements, the BTS electronics are subject to large temperature fluctuations and weather conditions that can reduce the longevity of the electronics.

What is needed is a cellular network that combines a low-cost transceivers with a flexible deployment technique to gain communication coverage over a large area at a low cost. What is also needed is a radio management system to manage such a cellular network.

SUMMARY

The invention overcomes the identified problems and provides a cellular network that combines a low-cost transceivers with a flexible deployment technique to gain communication coverage over a large area at a low cost. The invention also provides a radio management system to manage the cellular network.

An exemplary embodiment of a cellular network for providing wireless communication with a plurality of mobile stations includes a mobile switching center (MSC) having a public interface configured to communicate with a public switched telephone network (PSTN) and at least one private interface configured to communicate with a private network. The MSC is configured to route calls from the public network to the private network and from the private network to the public network. A base station controller (BSC) is coupled to the MSC private interface and configured to communicate with the MSC. A concentrated base transceiver station (CBTS) is coupled to the BSC and configured to communicate with the BSC. A plurality of remote transceivers (RTRXs) are coupled to the CBTS and configured to communicate with the CBTS and with the mobile stations (MS).

One aspect of the invention is that call switching can be accomplished in the BTS or the BSC components, rather than having the call backhauled to the MSC. This aspect of the invention is useful in networks where at lease some of the communication traffic is from one mobile station to another within the cellular network.

Another embodiment includes an operations maintenance center (OMC) coupled to the mobile switching center and configured to monitor the network. The OMC maintains an operations parameter table that identifies network activity and events. The OMC also has a user interface that is configured to display information regarding status of the cellular network.

Advantages of the invention include a combination of low-cost transceiver and flexible deployment to gain communication coverage over a large area at a low cost.

BRIEF DESCRIPTION OF THE FIGS

Additional advantages of the invention will become apparent upon reading the following detailed description and upon reference to the drawings, in which.

Figure 3:
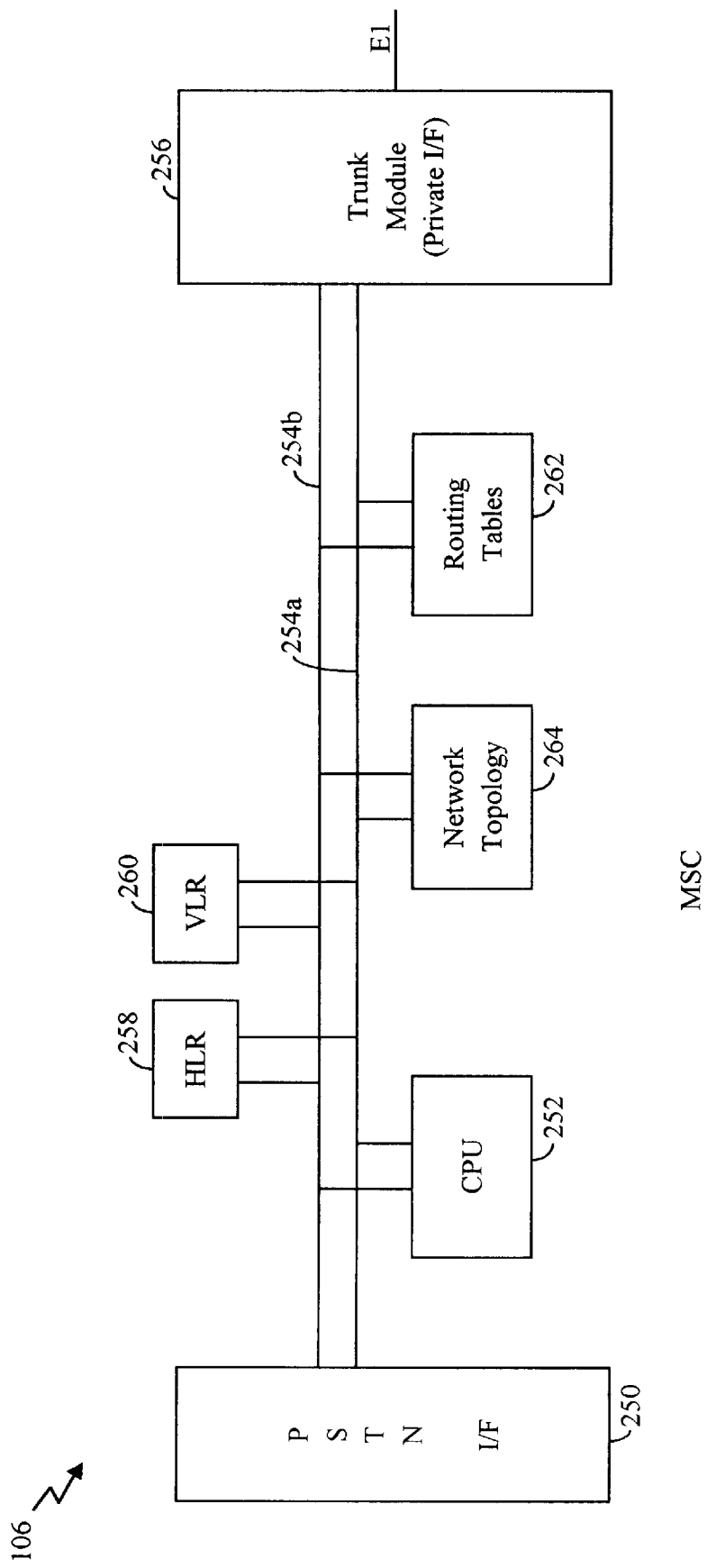
FIG. 3 depicts an MSC according to an embodiment of the invention.
Figure 5A:
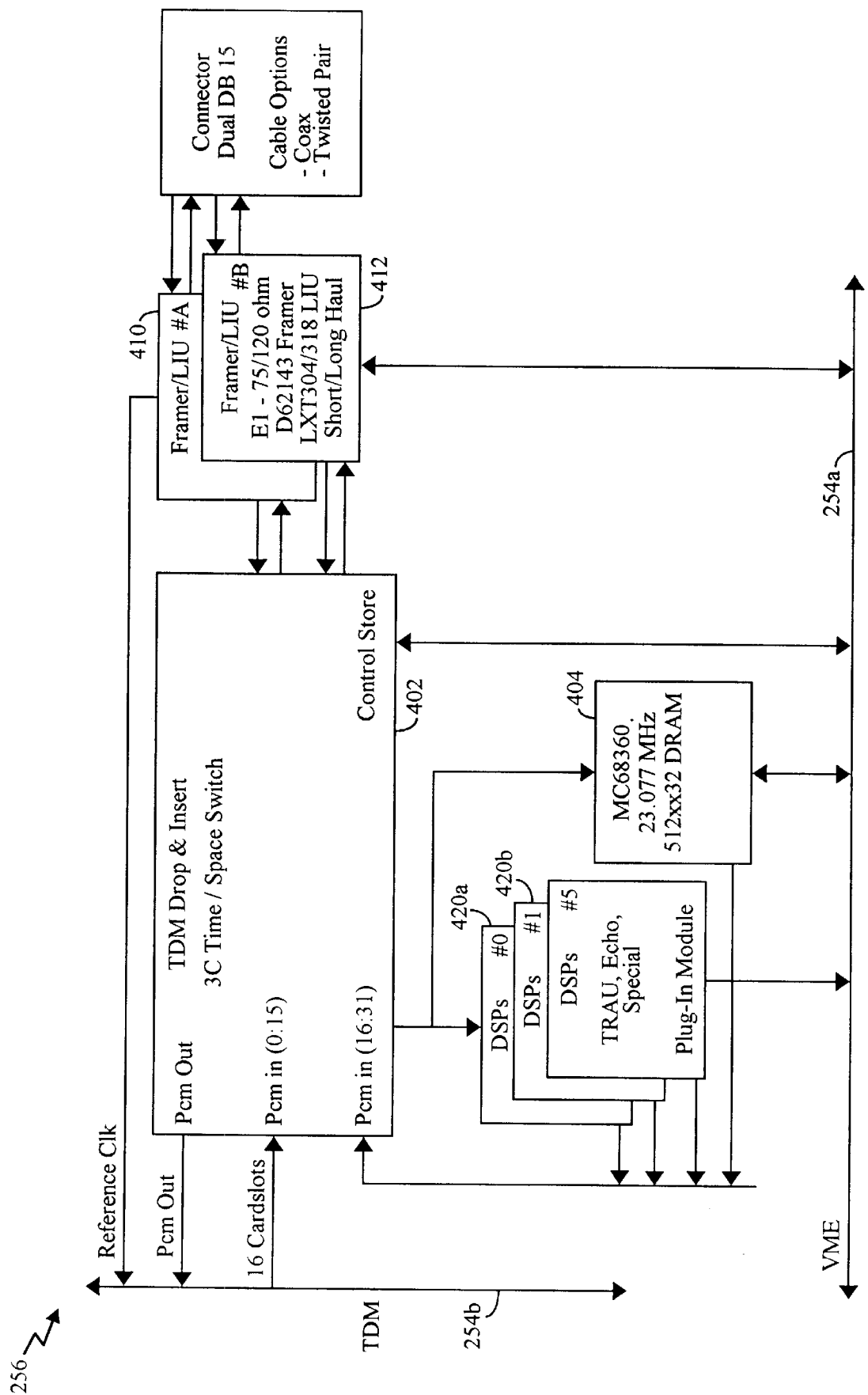
Figure 5B:
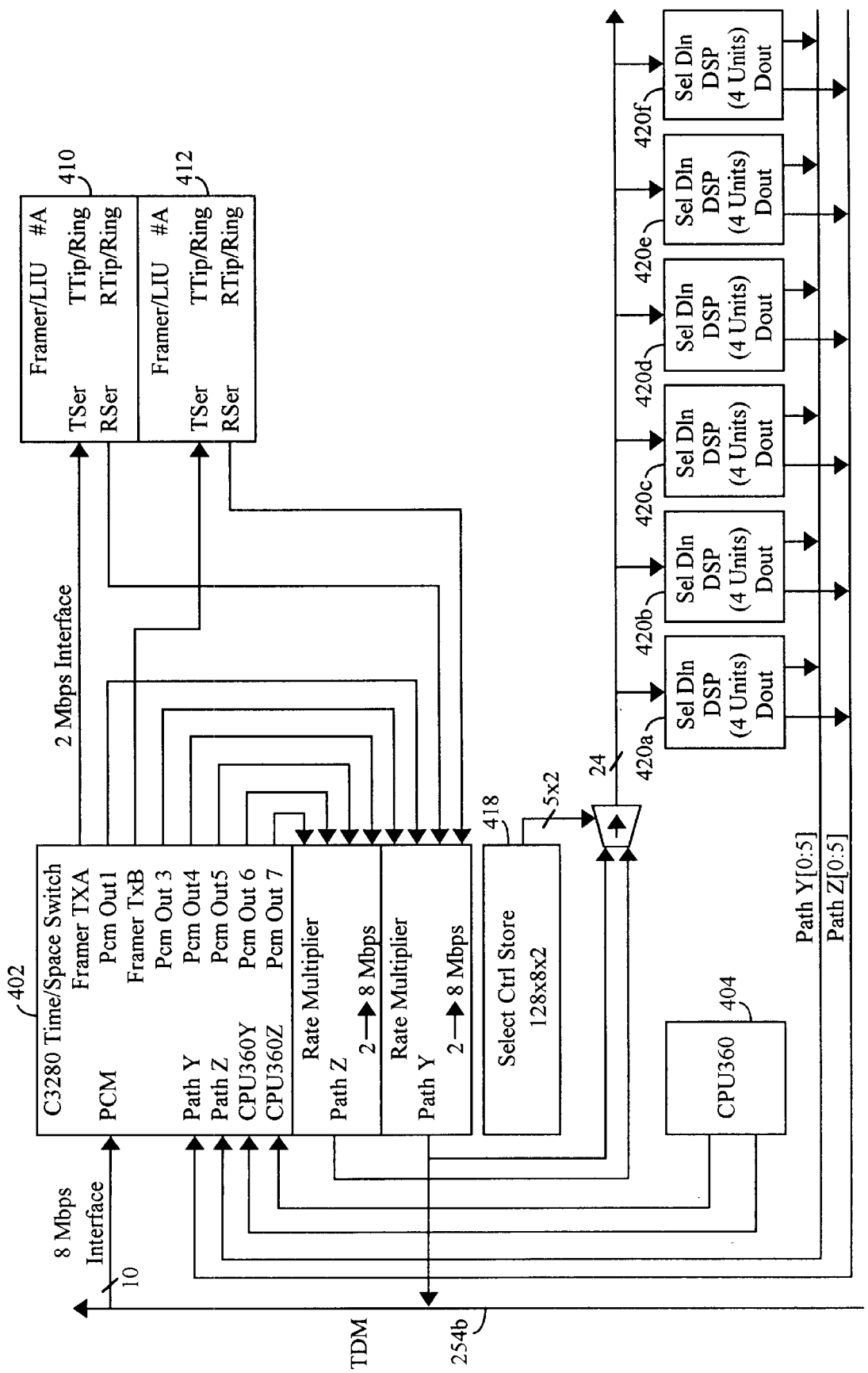
Figure 6:
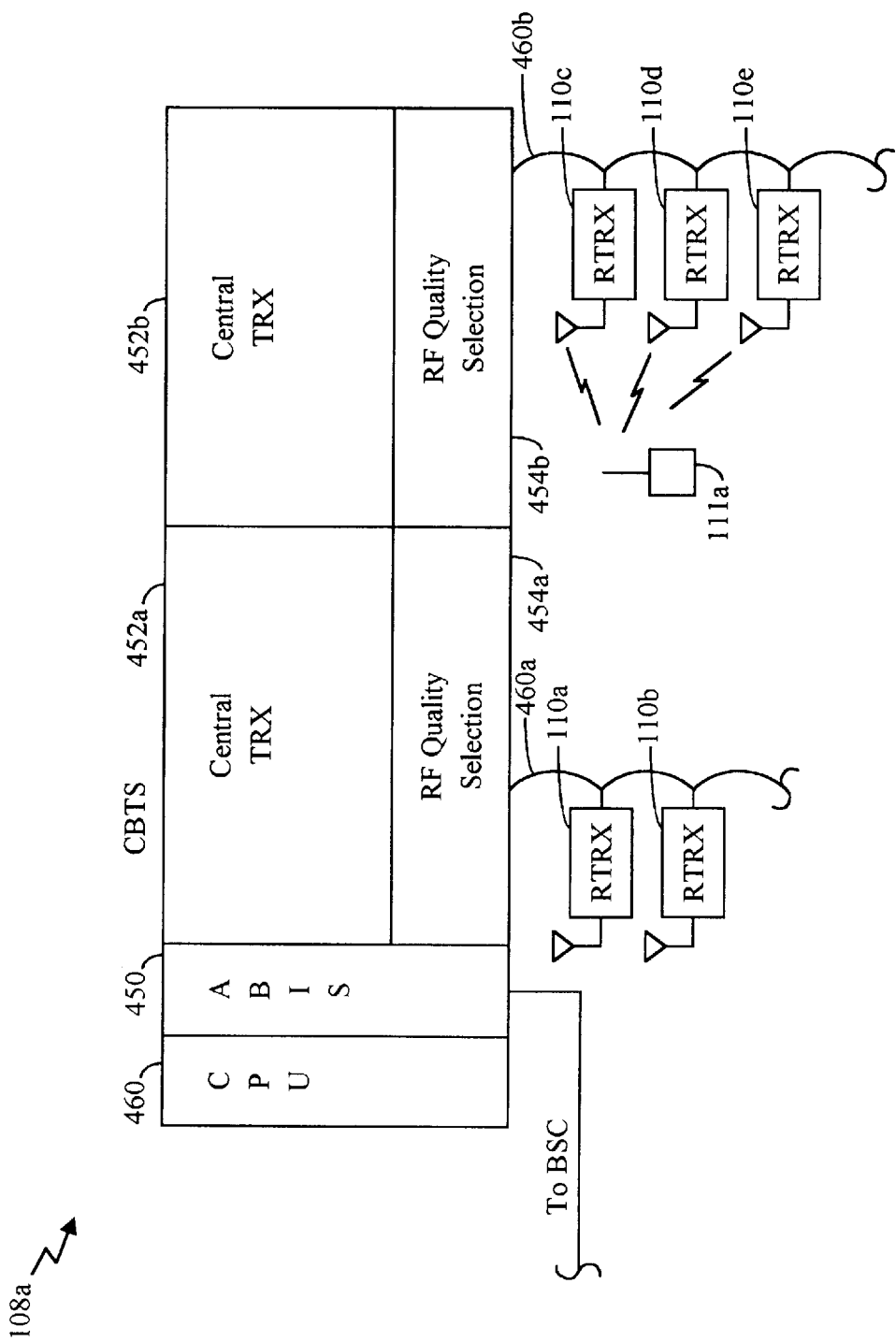
Figure 7:
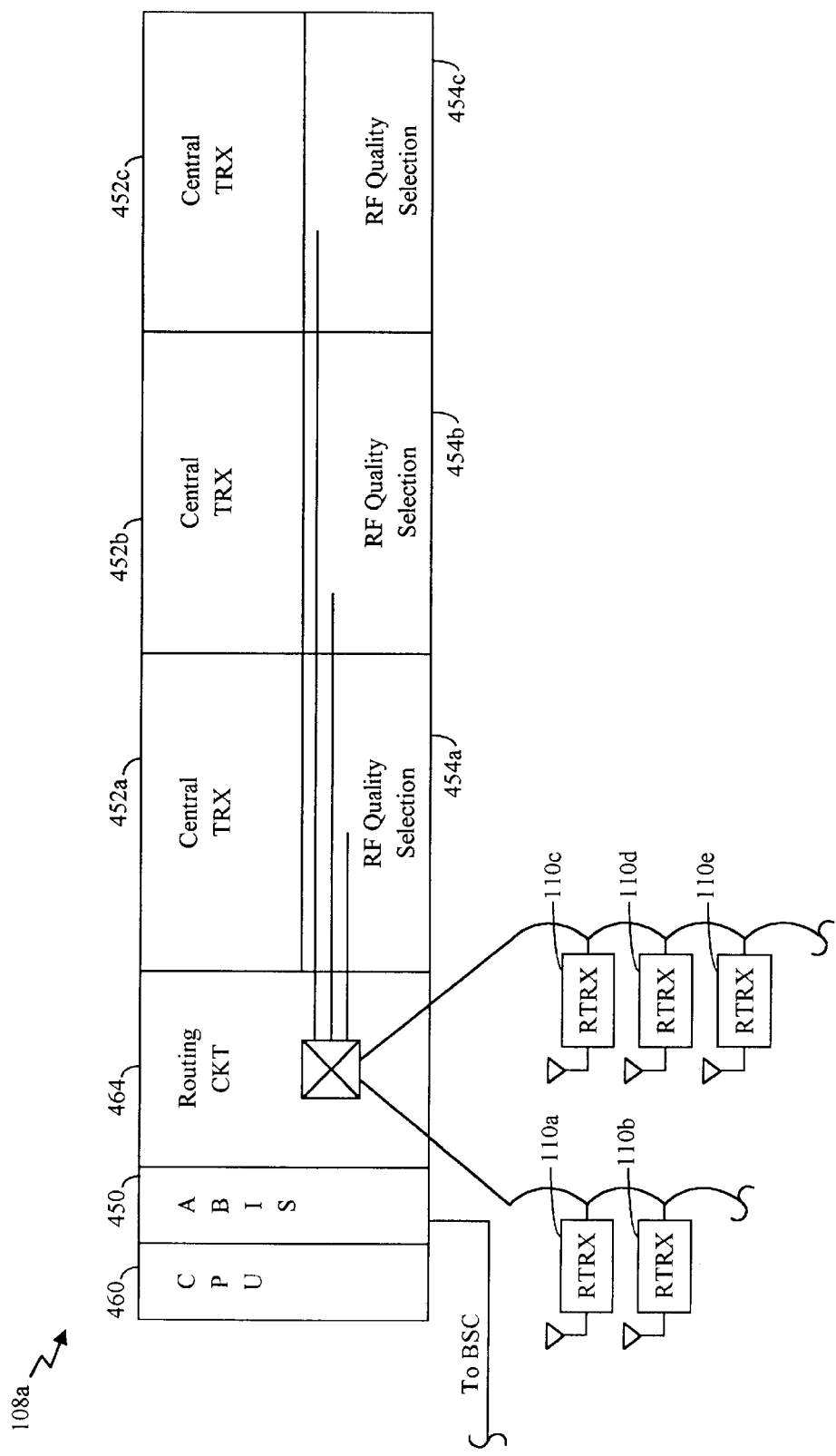
Figure 8:
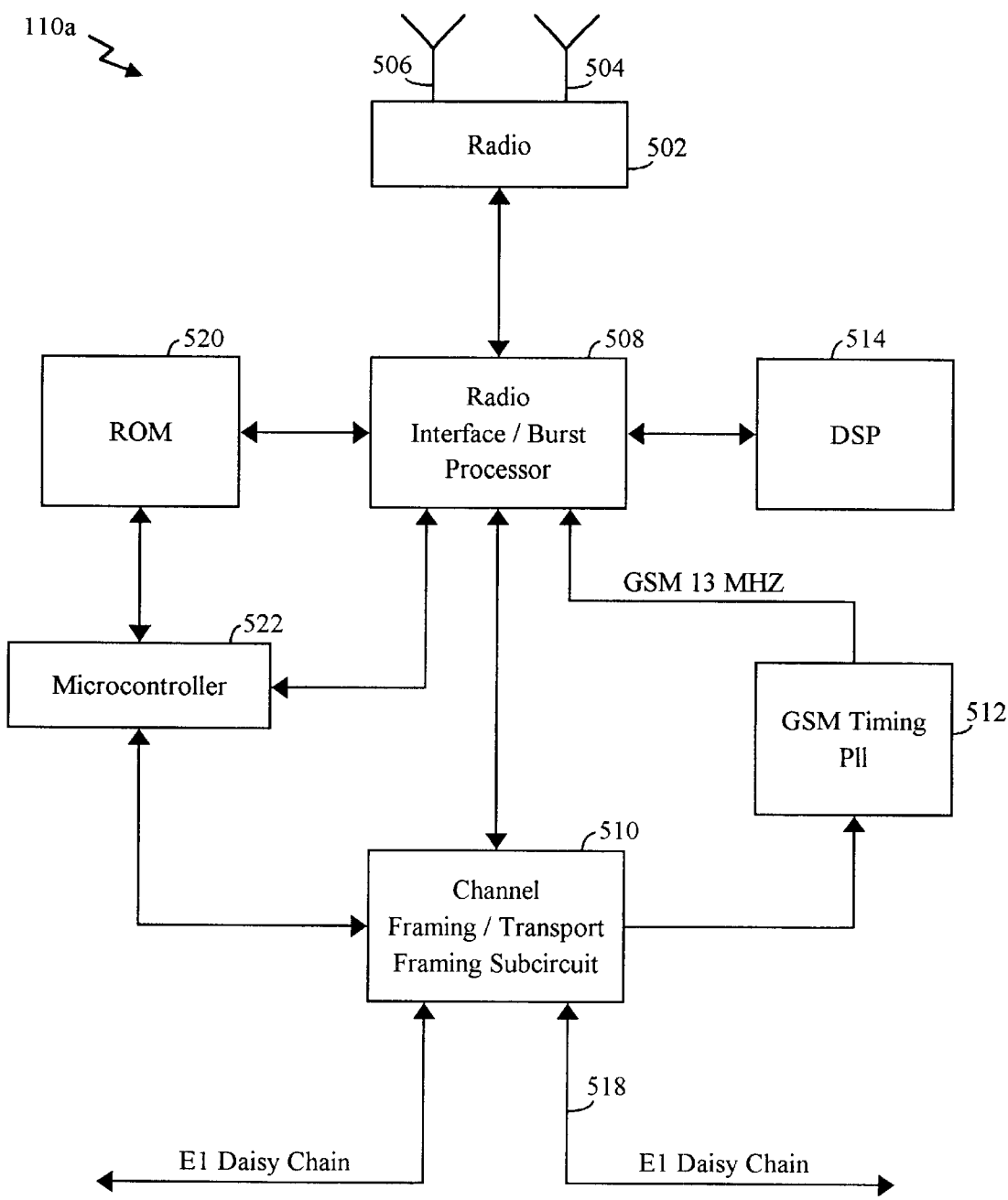
Figure 9:
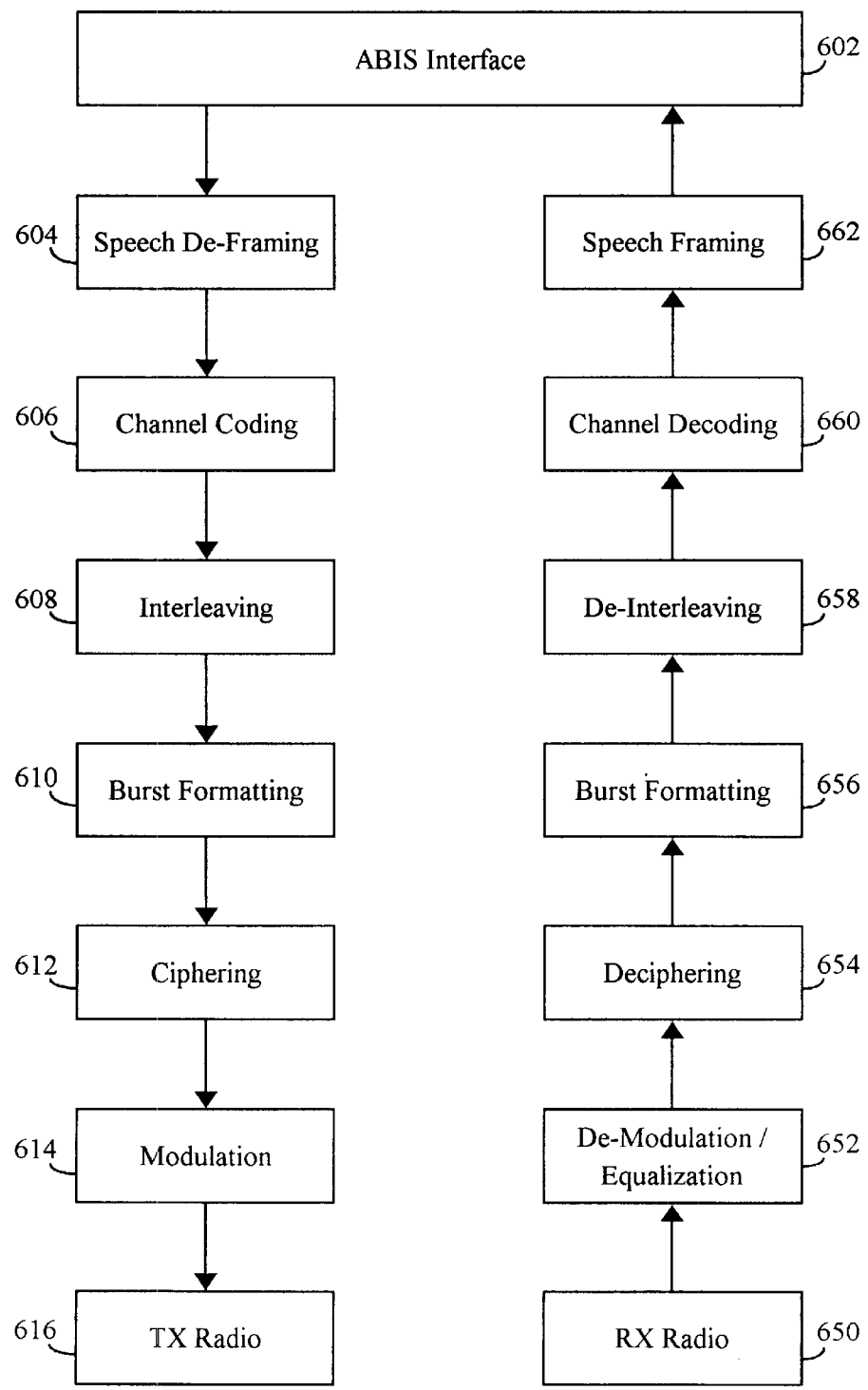
Figure 10A:
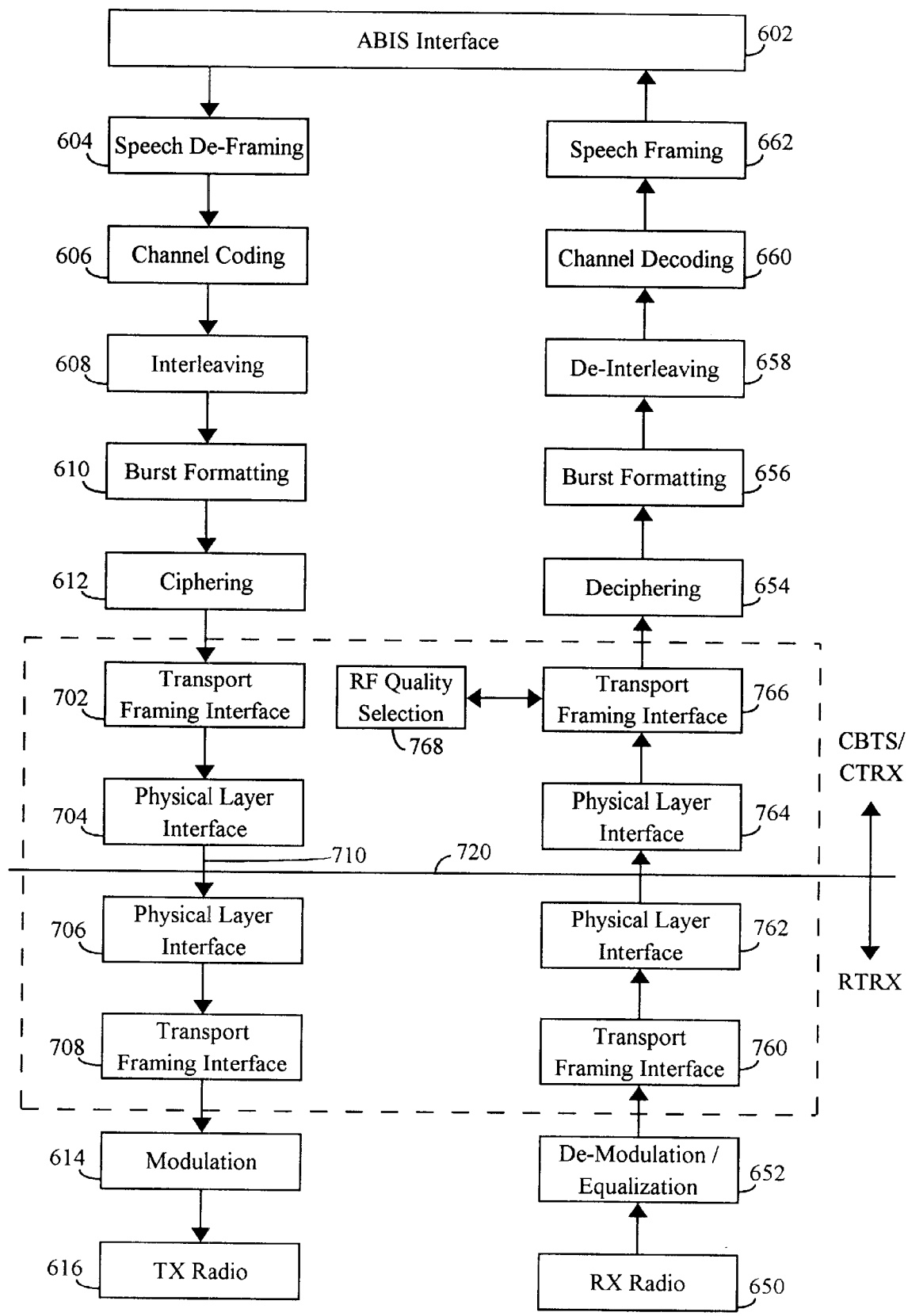
Figure 10B:
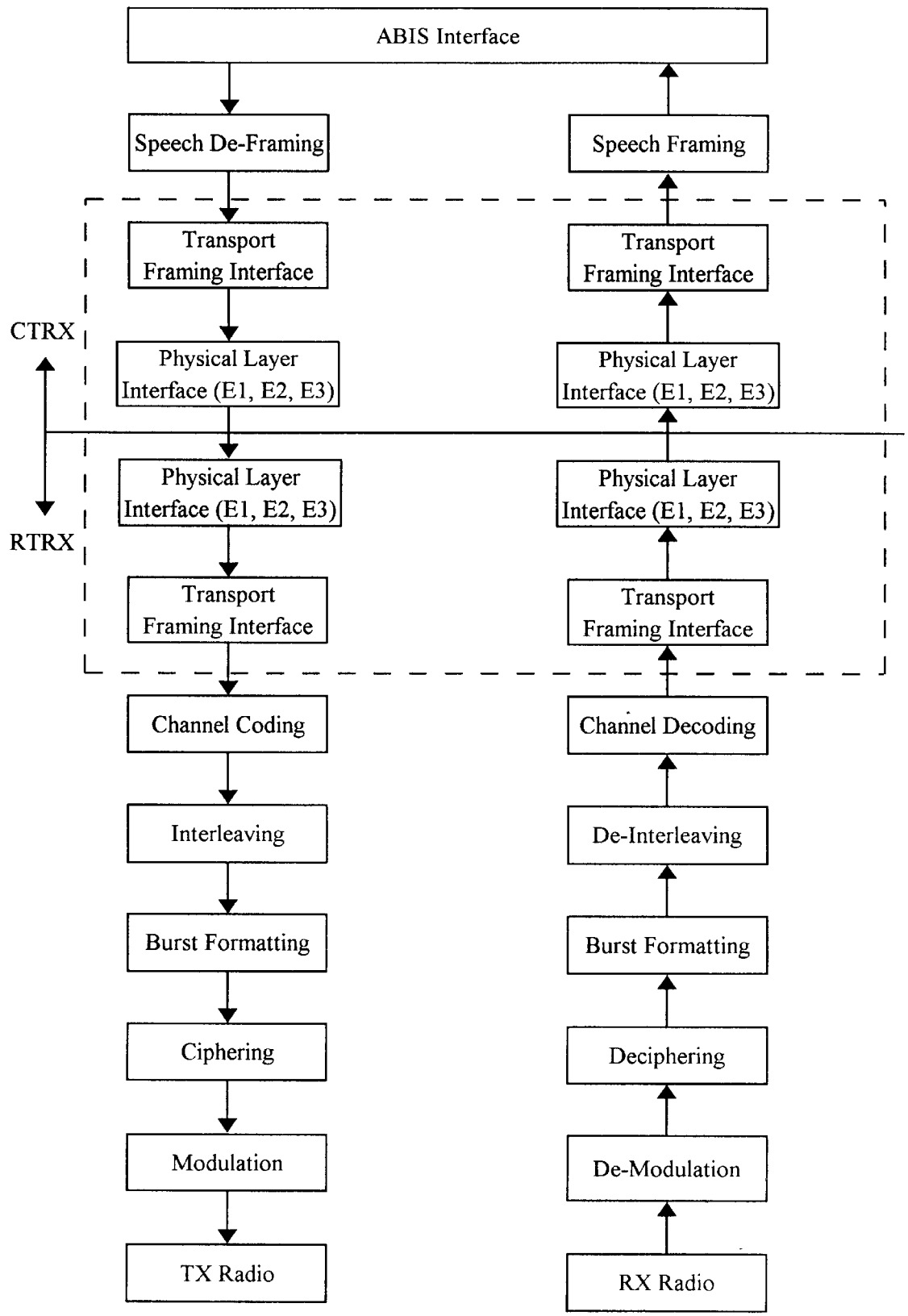
Figure 10C:
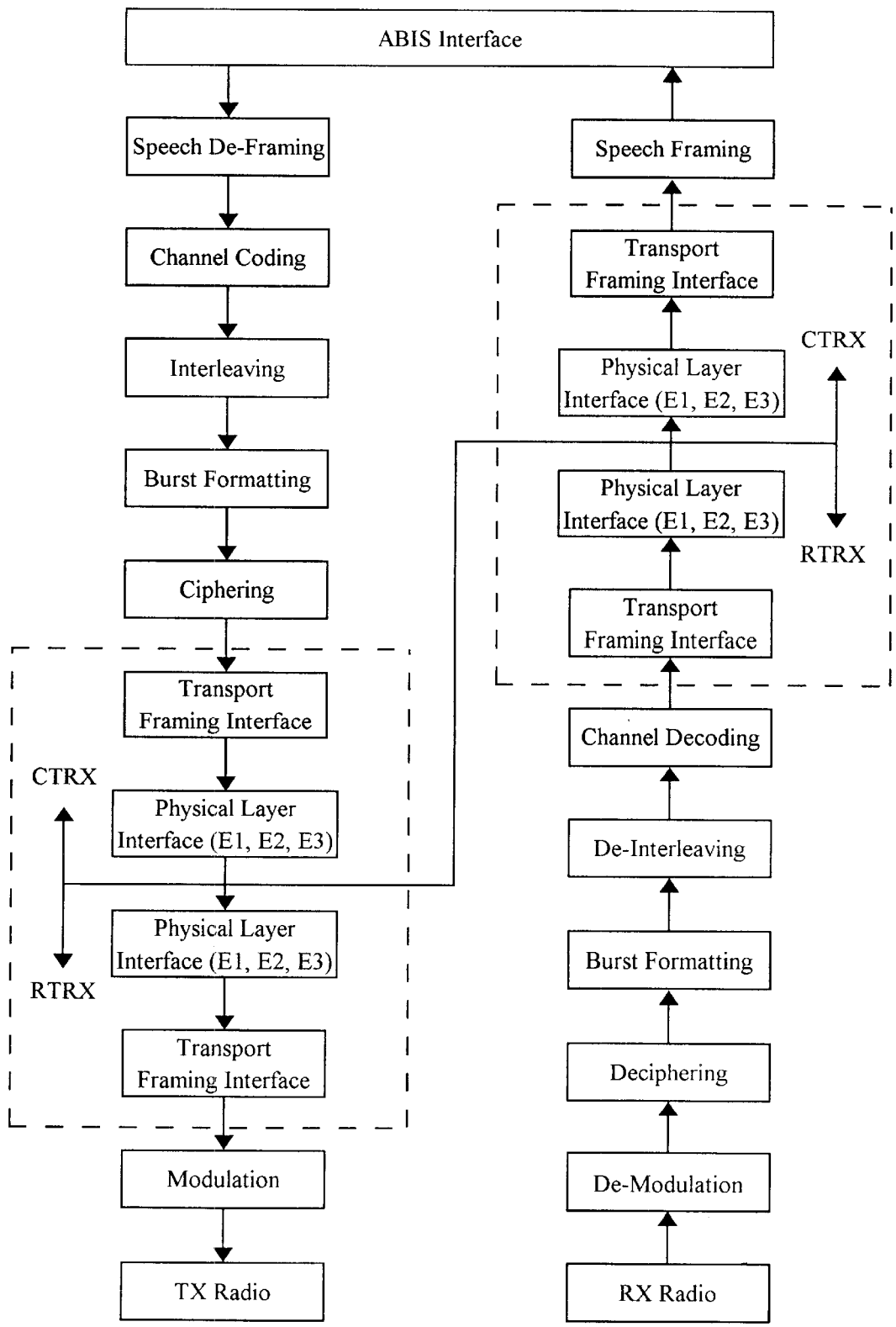
Figure 11:
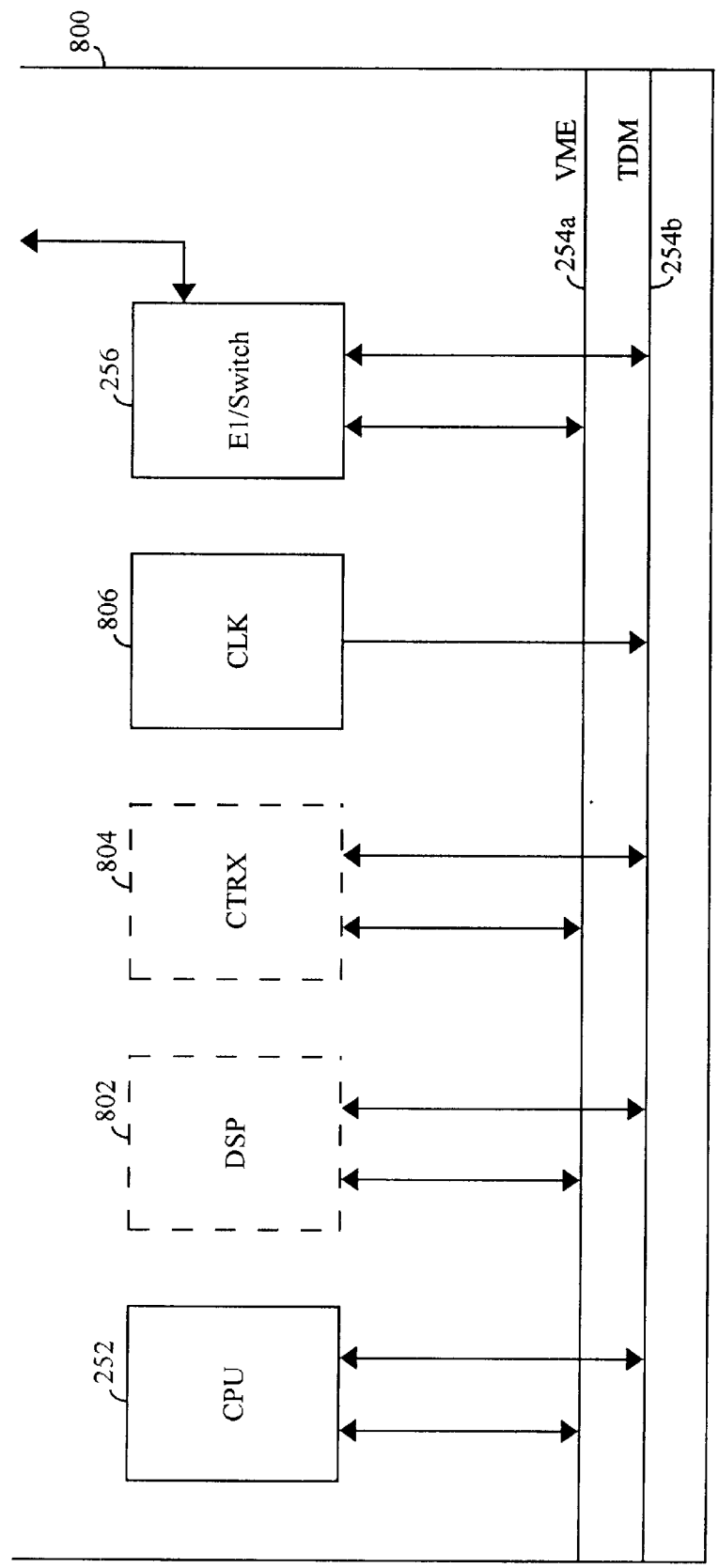
Figures 12, 13:
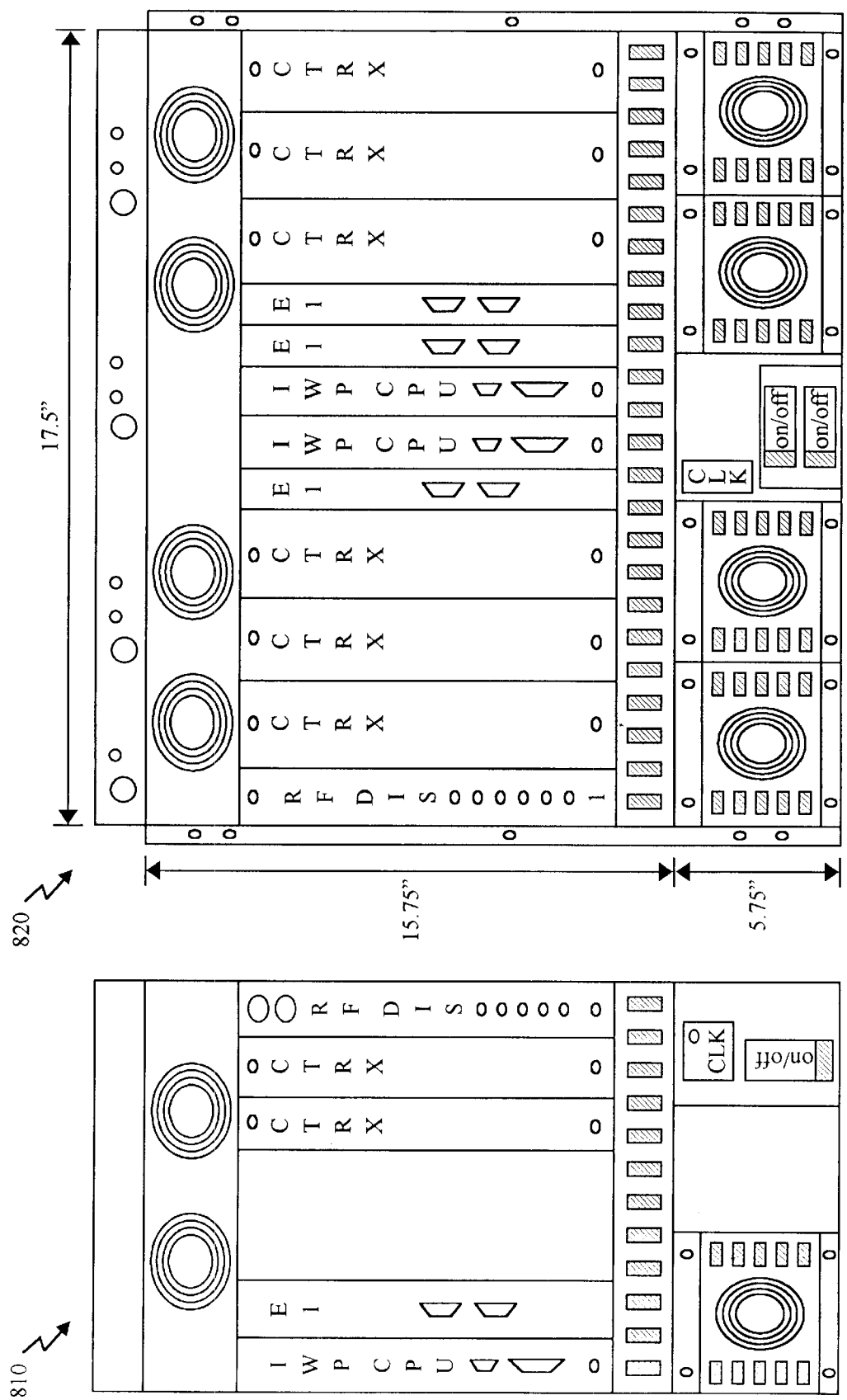
Figure 15:
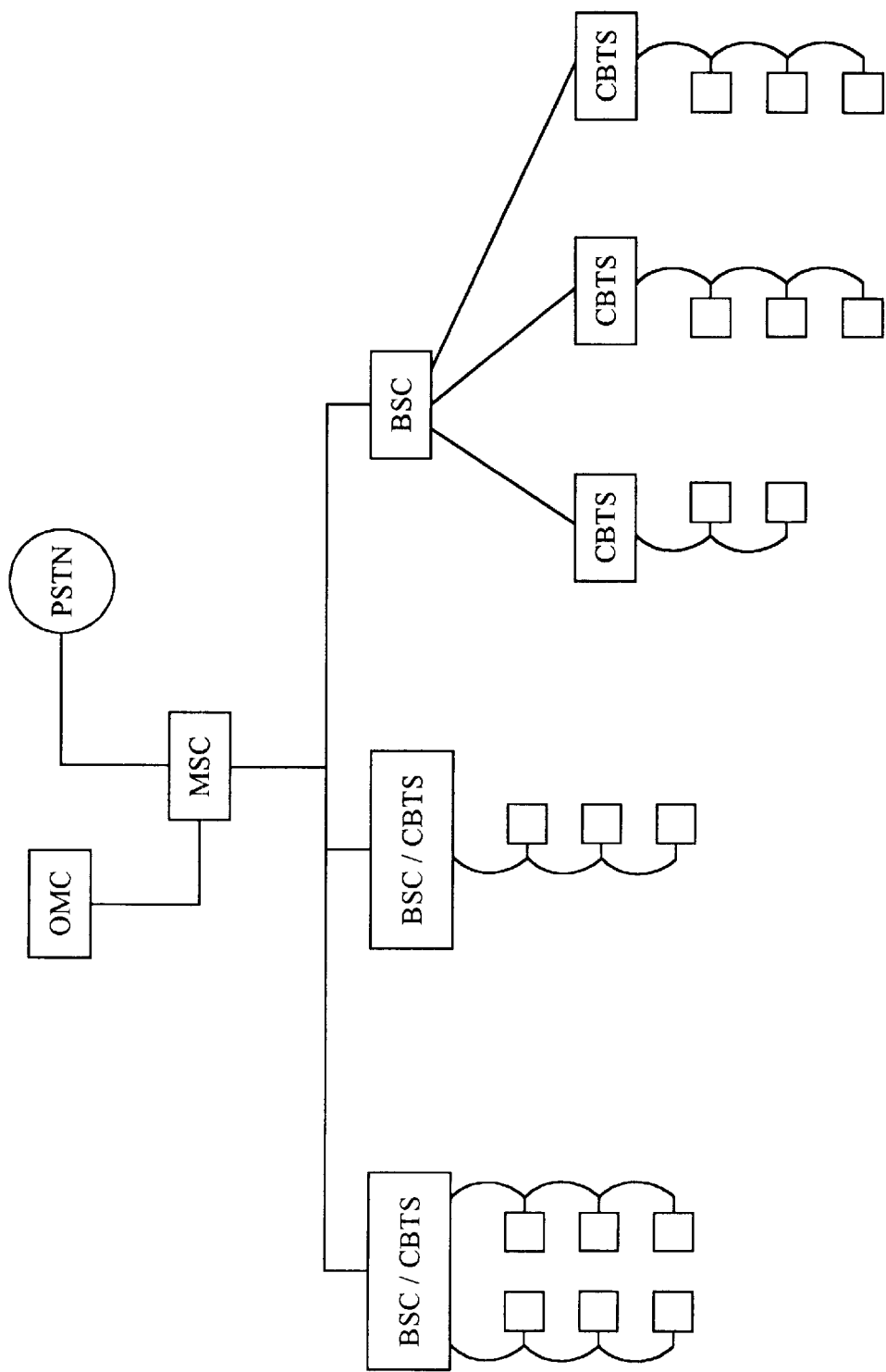
Figure 16:
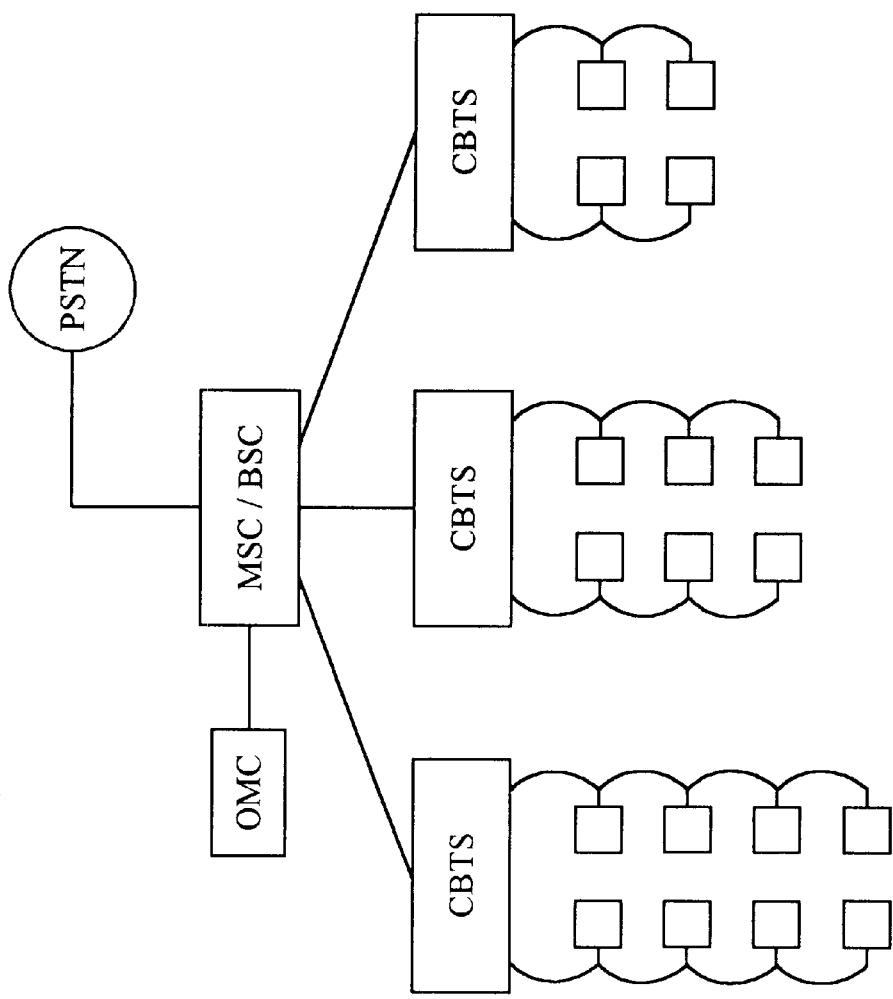
Figure 17:
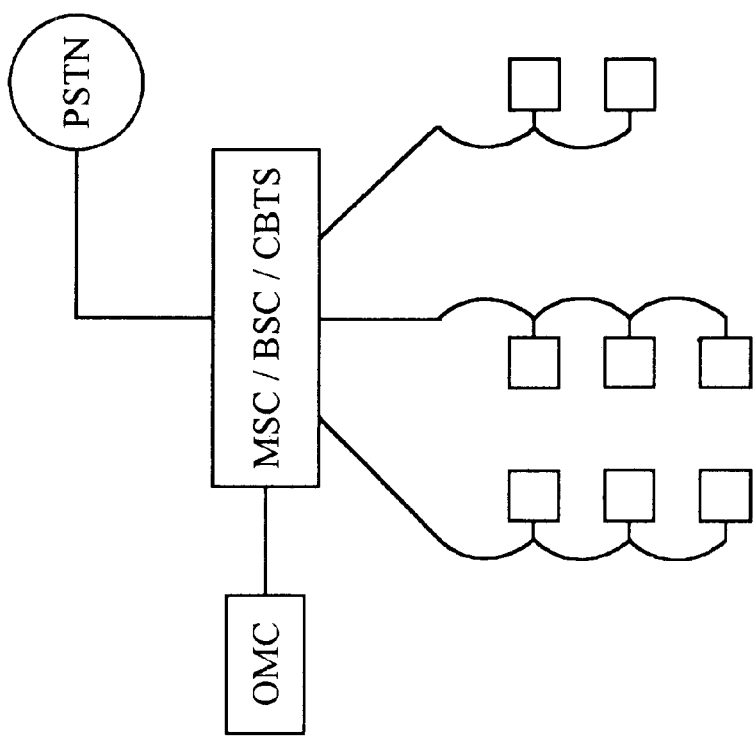
Figure 18:
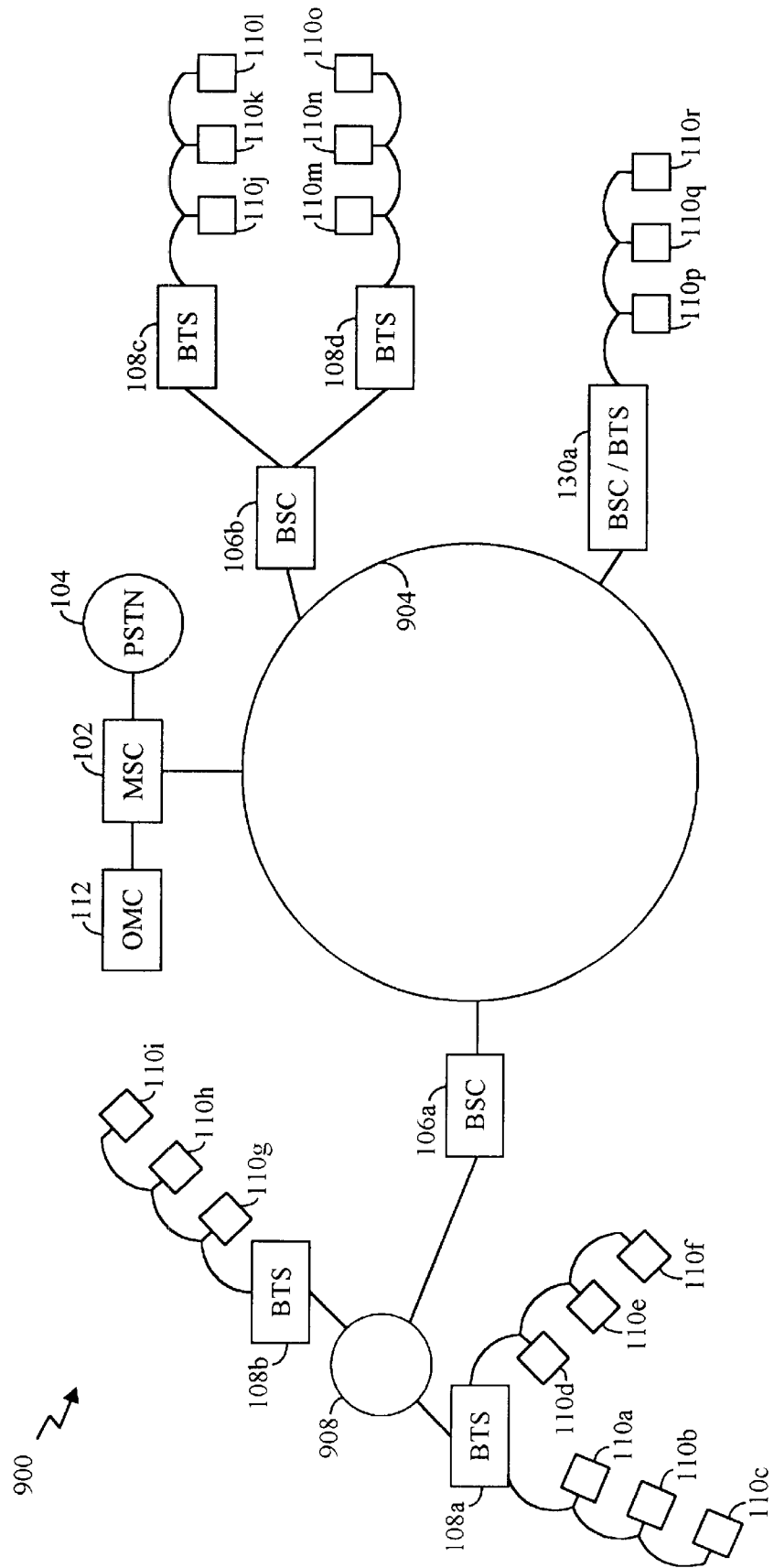

FIGS. 5A–B are block diagrams of the trunk module of FIG. 3;

FIG. 6 depicts a concentrated base transceiver station (CBTS) and remote transceivers (RTRXs) according to an embodiment of the invention;

FIG. 7 depicts a concentrated base transceiver station (CBTS) and remote transceivers (RTRXs) according to another embodiment of the invention;

FIG. 8 is a block diagram of a remote transceiver (RTRX) according to an embodiment of the invention;

FIG. 9 is a data flow diagram for a conventional GSM base transceiver station;

FIGS. 10A–C are data flow diagrams for a CBTS and RTRX according to an embodiment of the invention;

FIG. 11 is a block diagram of an embodiment of the invention for use in a configurable chassis;

FIG. 12 depicts a configured chassis according to an embodiment of the invention;

FIG. 13 depicts a configured chassis according to an embodiment of the invention;

FIG. 14 is a table depicting various embodiment of the invention;

FIG. 15 is an alternate architecture according to an embodiment of the invention;

FIG. 16 is an alternate architecture according to an embodiment of the invention;

FIG. 17 is an alternate architecture according to an embodiment of the invention; and FIG. 18 is an alternate architecture according to an embodiment of the invention.

DETAILED DESCRIPTION

Exemplary embodiments are described with reference to specific configurations. Those skilled in the art will appreciate that various changes and modifications can be made while remaining within the scope of the claims. For example, the exemplary embodiments employ a GSM standard, but any TDMA, FDMA, CDMA or other type standard can be employed.

A. Network Architecture

Figure 1:
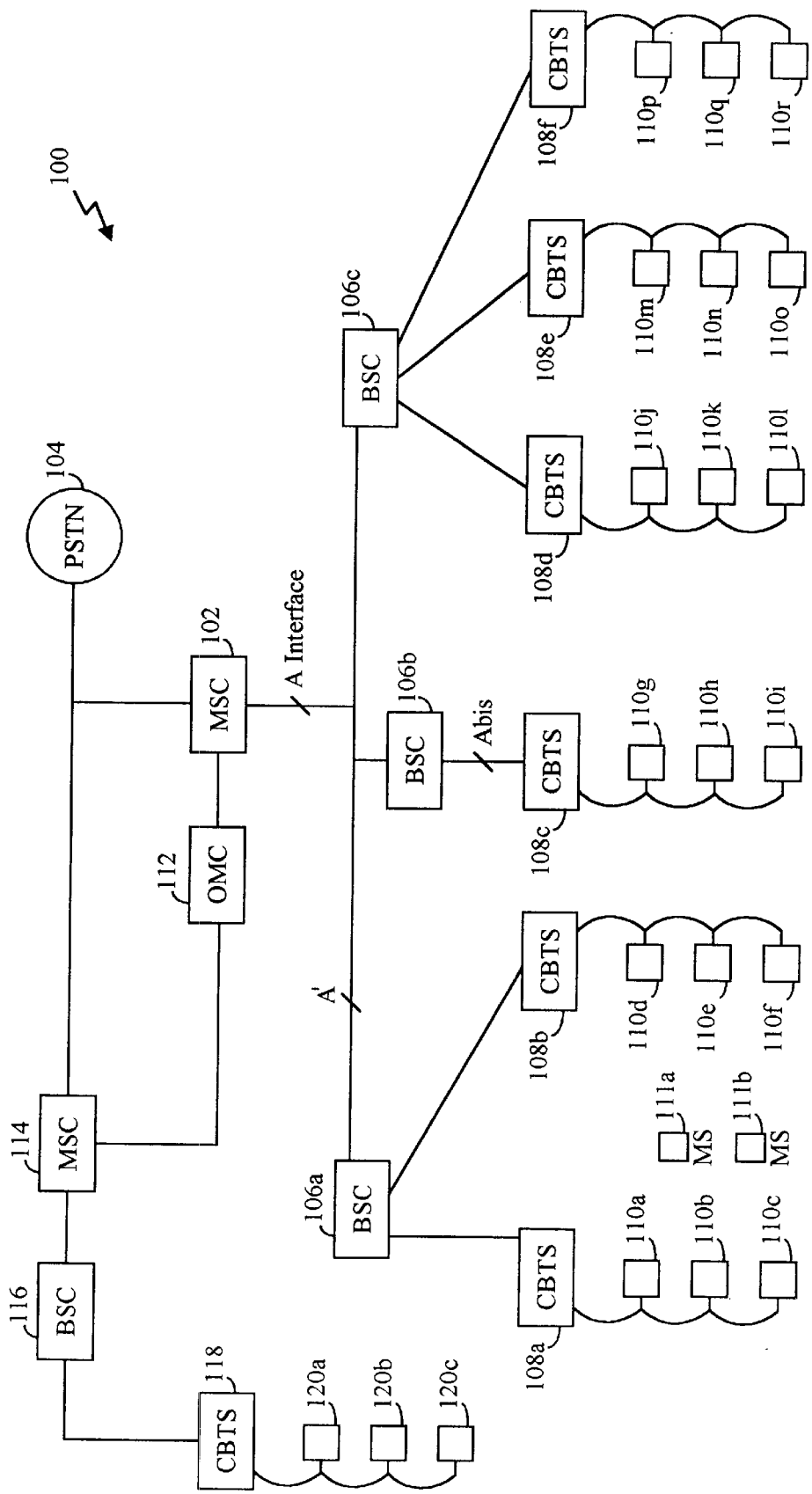
FIG. 1 depicts a cellular network communication system according to an embodiment of the invention.

FIG. 1 depicts a cellular network architecture according to an embodiment of the invention. A mobile switching center (MSC) 102 is coupled to a public switched telephone network (PSTN) 104. The MSC has an interface that is configured to communicate with the PSTN in order to receive calls from the PSTN and communicate them to the mobile stations and to receive calls from the mobile stations and communicate them to the PSTN. The MSC is part of a private network that includes base station controllers (BSC) 106a–106c, concentrated base transceiver stations (CBTS) 108a–108f and remote transceivers (RTRX) 110a–110r. The private network also includes an operations and maintenance center (OMC) 112. A second MSC 114, BSC 116, CBTS 118 and RTRX 120a–120c are also shown. These network components are described in greater detail below.

The network of FIG. 1 has several apparent benefits. First, the cellular coverage can be conveniently customized by placement of the RTRXs. Since each RTRX represents a microcell, the RTRXs can be placed in areas that can more easily cover the overall area desired to be covered by cellular communications. Second, since the RTRXs represent a relatively minimal set of hardware, they are relatively inexpensive. Therefore, the cost of deployment is low and the overall system is relatively cheap to build and install. Third, since the RTRXs communicate with the CBTS over a coaxial or optical cable, they can be placed outside where the antenna is needed. This reduces the electronics that are exposed to weather elements and allows the more expensive CBTS electronics to be installed inside a weather resistant enclosure, such as a building, where the temperature can be more accurately controlled. These three benefits, and others, serve to make the invention attractive to the technical cell designer because of the improved flexibility to design the cellular coverage, attractive to the installation technicians who can consolidate the heavy and expensive equipment placement inside of buildings and then run coax or optical cables outside to place the smaller RTRXs in their respective positions, and attractive to the financial managers who can manage the system deployment at a reduced overall cost and with lower associated maintenance and repair costs.

1) OMC

Figure 2:
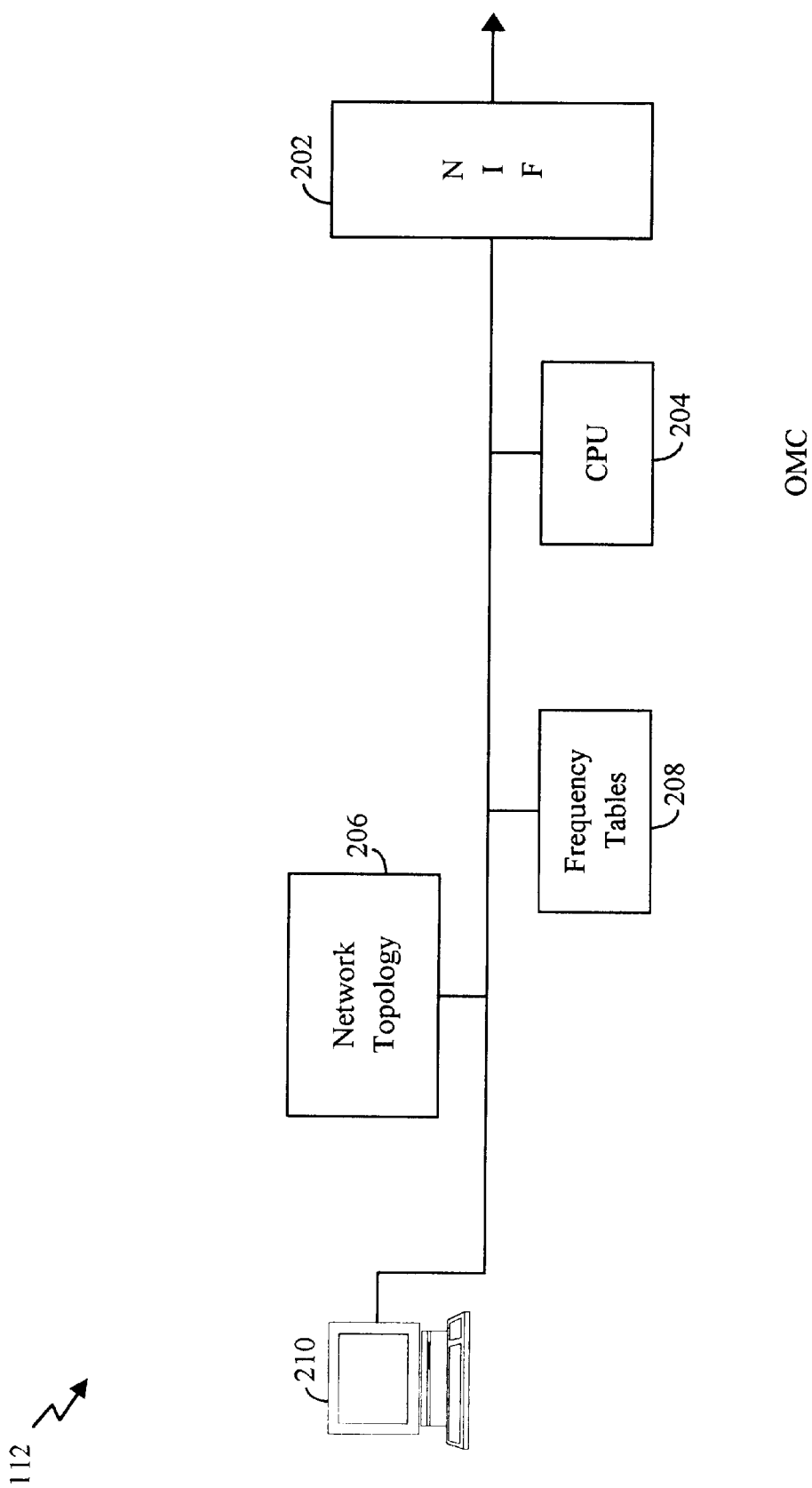
FIG. 2 depicts an OMC according to an embodiment of the invention.

Referring to FIG. 2, the OMC 112, is configured to oversee the call management. The OMC includes a network interface (NIF) 202 to communicate with the private cellular network. A central processor (CPU) 204 is for processing information from the cellular network and for interacting with the other portions of the OMC. A network topology memory 206 is coupled to the CPU and is used by the CPU to retrieve the topology of the cellular network. A frequency table memory 208 is coupled to the CPU and is used to maintain information regarding mobile station frequencies as needed. A user interface 210 is provided to receive information from a technician and to provide information to the technician. The OMC is configured to oversee the call management and to report conditions to the user interface 210. The OMC's management functions include network management, configuration management, alarm and event management, subscriber management, and test and diagnostic management. The OMC's network management functions include checking fault conditions, performing fault diversion, routing extra traffic, recording and avoiding interference conditions, executing test and maintenance programs, and monitoring the subscriber base and other conditions. These functions are described in greater detail below.

2) MSC and BSC

MSC has the ability to route telephone calls from the PSTN to the private network, from the private network to the PSTN and within the private network. The private network includes BSCs that communicate with the MSC and control the individual base transceiver stations (BTS). The BTS in the exemplary embodiments includes a concentrated base transceiver station (CBTS) and remote transceivers (RTRX). A detailed explanation of the CBTS and RTRX is described in U.S. Ser. No. 08/914,982, filed Aug. 20, 1997 and incorporated herein by reference.

Communication between the BSC and MSC is performed at the A interface. In one embodiment, the physical transmission medium is a cable, and the traffic data, the radio control signaling and status are passed between the BSC and the MSC through an Asynchronous Transfer Mode (ATM) link using a digital baseband physical layer protocol (T1, E1, E2, E3, DS1, DS3, or the like). Alternately or additionally, an Internet Protocol (IP) communication technique can be employed.

Referring to FIG. 3, the MSC 106 is configured to communicate inbound and outbound calls with the PSTN via public interface 250. A detailed explanation of the routing capabilities is described in U.S. Pat. No. 5,734,979, incorporated herein by reference. A central processing unit (CPU) 252 is coupled to a VME bus 254a that receives the communication from the public interface 250. The CPU 252 is also coupled to a TDM bus 254b. The CPU serves many uses including to control the transfer of inbound information and outbound information between the public interface 250 and a trunk module 256, or sometimes called a private interface. The trunk module has an E1 interface for communicating with the rest of the private network. This type of interface is known in the art and can alternately be a T1, DS0 or other interface. The MSC includes a home location registry (HLR) 258 and visitor location registry (VLR) 260. These registries store information intended to keep track of the mobile stations and to authenticate them during initialization. The MSC includes routing tables 262 to enable the MSC to allocate communication frequencies to the mobile stations and RTRXs in order to reduce interference and to promote reuse of the frequencies. These types of algorithms are known in the art and some novelties of the invention are described in detail below. The MSC includes a network topology storage so that the MSC can identify each of the BSCs, CBTSs, RTRXs and other network components. The network topology information provides the MSC with a basis on which the communication frequencies can be allocated to the mobile stations, and on which maximum cellular coverage can be achieved.

Figure 4:
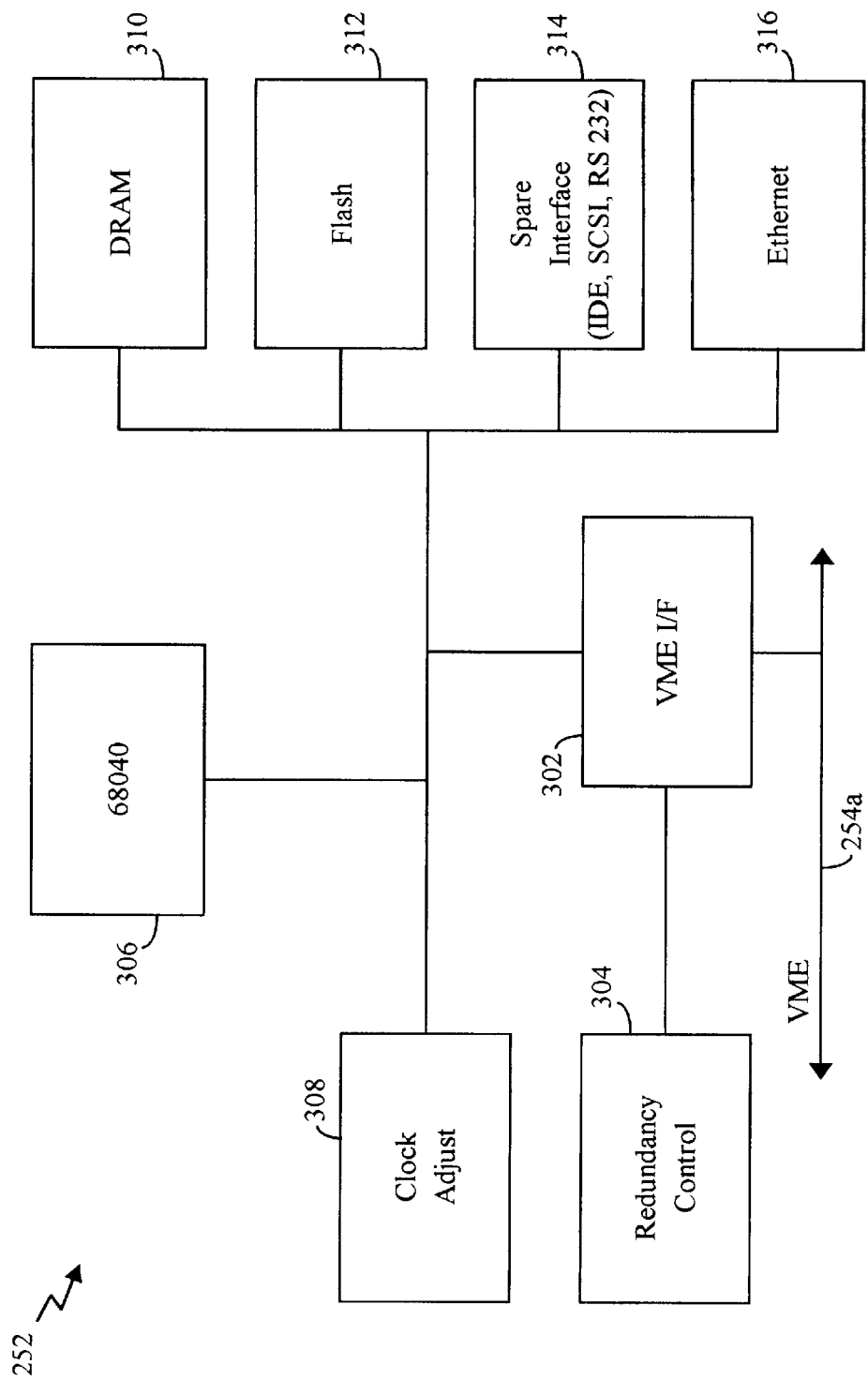
FIG. 4 is a block diagram of the central processor of FIG. 3.

FIG. 4 depicts CPU 252. In detail, a VME interface 302 is coupled to the VME bus 254a. A redundancy control 304 is coupled to interface 302 to monitor interface 302 and to take over if necessary. Processor 306 is coupled to interface 302 to communicate over the VME bus 254a. Processor 306 receives the packetized information from a mobile station when a call is placed. Processor 306 controls the signaling path of the call and configures the trunk module 256 to accommodate the call switching. Additionally, processor 306 performs many of the housekeeping and scheduling functions required in the MSC such as maintaining a record of active mobile stations, their information rates, call connection information and other information. Clock adjust 308 receives a clock signal and correlates the signal with other tracking information, such as data transfer clocks, to conform the clock to a uniform standard. CPU 252 also has a variety of ports for modules such as DRAM 310, flash memory 312, a spare port 314 for IDE, SCSI, or RS232, and ethernet 316.

Some configurations described below have several CPUs. Benefits of additional CPUs include redundancy, flexibility and increased central processing power. When the MSC is coupled to several other network elements, processing power is useful to coordinate inbound and outbound information, and to control trunk module 256 switching as described below.

FIGS. 5A–B depict trunk module 256. At the heart of the trunk module is a time/space switch 402, which is coupled to both the TDM bus 254b for data and the VME bus 254a for control. Time/space switch 402 is capable of routing information between the TDM bus, processor 404, interface framers 410, and DSPs 420a–420f. Time/space switch 402 is described herein according to its communication data rates and switch capabilities. Any device capable of performing these functions can be used in the present invention such as the 3C Ltd. C3280 processor or the Siemens family of digital switching ICs of which PEB 2045 memory time switch is an example.

Time/space switch 402 has many ports as shown in FIG. 5B. A PCM input port is coupled to all 16 TDM subbusses, which can each transfer 8 Mbps. In essence, time/space switch 402 can communicate with up to 16 modules such as TRXs, other trunk modules, or any other type modules attached to the TDM bus. A larger number is possible if time/space switch 402 is configured to have even more ports and the TDM bus is configured to have even more subbusses.

Time/space switch 402 supports many of the switching functions described in U.S. Pat Nos. 5,734,699 and 5,577,029, incorporated herein by reference. Moreover, when the base station is configured to perform switching functions, the base station can perform functions of a cellular PBX, a local loop, or other similar functions.

Processor 404 is coupled to time/space switch 402 via 8 Mbps CPU360Y and CPU360Z input ports, and further coupled to 8 Mbps PathY and PathZ output ports, as shown. Processor 404 is also coupled to VME bus, as shown in FIG. 5A. Processor 404 is provided to perform protocol processing. Possible protocols include Abis, A, SS#7, ISDN and others. This processing enables cooperative interworking between other elements of the GSM network and the PSTN. Moreover, processor 404 provides distributed processing that is dedicated to the trunk module 256 and becomes scaled as the number of trunk modules increases. Processor 404 also serves as a protocol engine for the trunk module 256 and helps reduce latency and improve performance for handling SS#7 signaling. If protocol processing is not required, and a CPU 252 is present in the configuration, then processor 404 may be omitted since CPU 252 includes processor 306 for performing general functions.

DSPs 420a–420f are coupled to time/space switch via 8 Mbps PathY and pathZ output ports. When echo canceling, rate adaptation, or some other function is required, time/space switch 402 routes the information to a DSP 420 to perform the processing. As shown, there are 6 DSPs 420a–420f, however, there may be from zero to any number as required for the processing. A select control store 418 controls what information is transferred to which DSP 420a–420f. Once DSPs 420a–420f complete their respective functions, the information is then delivered back to time space switch 402 via pathY and pathZ input ports. The DSPs 420a–420f may be processors such as AT&T DSPp1611, TI TMS320C52 or similar.

To describe the TRAU function, for example, since a GSM mobile station communicates compressed voice at 16 Kbps, while the PSTN DS0 interface is 64 Kbps, DSP 420 modifies the compression to accommodate this rate change. The DSP 420 can also accommodate a rate change between any rates such as 8 Kbps, 16 Kbps, 64 Kbps and others.

A second aspect of the embodiment is apparent when a call is made from a first mobile station 111a to a second mobile station 111b within the network service area. Time/space switch 402 may simply route the inbound information from the first mobile station 111a back out onto the TDM bus as outbound information for the second mobile station 111b. This type of switching is explained in U.S. Pat. Nos. 5,734,979; 5,734,699; and 5,577,029, incorporated herein by reference.

The call routing function can also be performed in a variety of other ways depending on the mobile station communication with the network. For example, if a first mobile station 111a and a second mobile station 111b are communicating with a single RTRX 110b, the RTRX can receive the inbound data from the first mobile station and then send it as outbound information to the second mobile station. Since both the inbound information and outbound information are at 13.2 Kbps, and is routed inbound and outbound within a single RTRX, it does not need to be packed into a 16 Kbps data stream. As a second example, if a first mobile station 111a and a second mobile station 111b are communicating with different RTRXs, e.g. 110a and 110b respectively, but with the same CBTS 108a, the first RTRX 110a receives the inbound data from the first mobile station 111a and then route the information through the CBTS 108a and send it as outbound information to the second RTRX 100b and then to the second mobile station 111b. Since the inbound and outbound information are processed by different RTRXs, the information is packed into a 16 Kbps data stream for communication with the CBTS 108a. As a third example, if a first mobile station 111a is communicating with a first RTRX 110a associated with a first CBTS 108a and a second mobile station 110b is communicating with a second RTRX 110e that is associated with a second CBTS 108b, the first RTRX receives the inbound information and sends it via the CBTS 108a and BSC 106a to the second CBTS 108b, which treats it as outbound information to the second RTRX 110e and second mobile station 111b. Since the inbound and outbound information are processed by different RTRXs, the information is packed into a 16 Kbps data stream for communication between RTRXs. As a fourth example, if a first mobile station 111a is communicating with a first RTRX 110a associated with a first CBTS 108a and a first BSC 106a and a second mobile station 110b is communicating with a second RTRX 110h that is associated with a second CBTS 108c and a second BSC 106b, the first RTRX receives the inbound information and sends it via the CBTS 108a, BSC 106a and BSC 106b to the second CBTS 108c, which treats it as outbound information to the second RTRX 110h and second mobile station 111b. Since the inbound and outbound information are processed by different RTRXs, the information is packed into a 16 Kbps data stream for communication between RTRXs. Note that these examples do not send the information to MSC 102. Note also that these examples do not decompress the information to 64 Kbps.

3) CBTS and RTRX

In accordance with one aspect of the present invention, there is provided a CBTS architecture in which the transceiver (TRX) is divided into two subsystems: a central TRX (CTRX) subsystem which co-resides with the CBTS and a remote TRX (RTRX) subsystem which is geographically remote from the CBTS and the CTRX. This aspect of the invention is described in U.S. Ser. No. 08/914,982, filed Aug. 20, 1997, incorporated herein by reference. In accordance with this aspect of the invention, the RTRX includes the RF antenna circuitry that is employed for transmitting outbound information and receiving inbound information with the mobile stations via RF signals. The outbound information and inbound information includes both signaling information and data information.

The antenna circuitry in each RTRX converts the outbound data from a digital format into RF signals for transmission to the mobile stations and converts RF signals from the mobile stations into digital inbound data for processing by the cellular network. Although additional processing capabilities may be built into the RTRX if desired, it is in general preferable to keep the circuitry within the RTRX minimized in order to simplify maintenance and upgrade. Additionally, since the RTRX may be implemented in hard to reach locations (e.g., locations which offer optimal transmission quality such as the top of building or other structure) or be exposed to weather elements, minimal RTRX designs promote ruggedness, which reduces maintenance costs.

FIG. 6 illustrates, in accordance with one embodiment of the invention, a CBTS 108a including Abis interface 450. In CBTS 108a, the antenna circuitry is implemented in RTRX subsystems 110a–1110e. Although each RTRX is shown with a single antenna, they may be implemented with separate transmit and one or more receive antennas. Each RTRX preferably includes the antenna circuits, e.g., the radio interface circuitry, as well as circuitry to process, in the uplink direction, the received RF signals into binary data bits to be sent to the CTRX (discussed below). Additionally, each RTRX preferably includes circuitry to process the downlink binary data bits received from the cellular network (via the CTRX) into RF signals to be transmitted to the mobile stations.

A plurality of CTRXs 452a–452b are implemented in CBTS 108a. Each CTRX is coupled at any given time to a unique set of RTRXs. In the implementation shown, RTRXs 110a–110b are coupled to CTRX 452a while RTRXs 110c–110d are coupled to CTRX 452b. The coupling between a RTRX and its CTRX may take place through any appropriate transmission medium including, for example, twisted pairs, co-axial cables, or fiber optics. In one embodiment, the transmission medium represents a twisted pair, and the traffic data, the radio control and status are passed between the CTRX and the RTRX through an Asynchronous Transfer Mode (ATM) link using a digital baseband physical layer protocol (T1, E1, E2, E3, DS1, DS3, or the like). Alternately or additionally, an Internet Protocol (IP) communication technique can be employed. Although each set of RTRXs is shown in FIG. 6 to be in a daisy-chain arrangement, individual RTRXs may be coupled to their associated CTRX in parallel.

In general, any number of RTRXs may be coupled to a CTRX, and data from each RTRX may bear an appropriate identifier to permit the CTRX to identify the RTRX from which the data is sent. In practice, the number of RTRXs may be limited to a reasonable number to suit the processing capabilities of the CTRX or to avoid overwhelming the transmission channel between the RTRXs and the CTRX. If the physical layer framing on transmission channel 460a is E1 (30 DS0s), about 5 or 6 (or more if capacity permits) RTRXs works well. For E2 physical layer framing, about 22 (or more if capacity permits) RTRXs may be daisy-chained to a CTRX. For E3 physical layer framing, a greater number (e.g., 88 or even more) RTRXs may be daisy chained due to the greater bit rate on the transmission channel.

Since the RTRXs are remotely separated from the CBTS (e.g., via cabling), the CBTS needs not be considered the base of the cell. With the present invention, each CTRX now effectively defines an aggregate cell, which is made up of the radio cells of the associated RTRXs. The RTRXs themselves, being remotely separated from the CTRX may be dispersed anywhere within the cell and may even be interspersed among RTRXs that are associated with other CTRXs. It should be appreciated that the multiplicity of sets of RTRXs, as well as their ease of positioning, offers the service provider flexibility in cell shaping in a manner that is simply unattainable in the prior art.

The individual radio cell may of course be shaped further using traditional antenna techniques, e.g., using directional antennas or increasing the transmit power. If transmit power is increased, the additional heat and power generated do not pose a danger to the processing circuitry of the CBTS as in the case of the prior art BTS circuitry, which are co-resident with the antennas of the prior art TRXs. On the other hand, it is typically the case that a given area previously covered by a high power TRX may be covered as well by multiple RTRXs, each transmitting at a lower power level. In this manner, a given area may be covered with an array of simple, rugged and lower power RTRXs, thereby substantially reducing the costs of implementing the BTSs, as well as minimizing the potential for cell-to-cell interference, and/or improving frequency reuse. The ability to employ lower power antennas while offering equivalent or better coverage in a given area is a significant advantage of the invention.

In FIG. 6, each set of RTRXs is shown directly coupled to its associated CTRX via the appropriate transmission medium. FIG. 7 depicts an alternate CTRX and RTRX implementation where routing resources are provided in both the RTRXs and the CBTS to facilitate dynamic assignment of, for example, CBTS Digital Signal Processing (DSP) resources to RTRXs of the aggregate cells. In this implementation RTRXs 110a–110e are daisy-chained to routing circuit 464. In one aspect, routing circuit 464 represents an Asynchronous Transfer Mode (ATM) routing circuit. Alternately or additionally, an Internet Protocol (IP) communication technique can be employed. A database, table, or intelligent algorithm controlling routing circuit 464 determines which RTRX is assigned to which of CTRXs 452a–452c. In this case, each RTRXs is associated with a unique ATM or IP address and provided with appropriate ATM or IP framing circuits to packetize the demodulated RF data for transmission to routing circuit 464 or to depacketize the ATM or IP data packets sent from routing circuit 464. Traffic data, radio control, and status data may be packed into the ATM or IP cells for transmission between a RTRX and its associated CTRX at up to about two bursts per cell. Analogous techniques may be employed if a Frame Relay Protocol is used.

FIG. 8 shows, in accordance with one embodiment of the present invention, a logic block diagram of a RTRX 110a. RTRX 110a includes a radio subcircuit 502, whose basic function is to transmit and receive RF information over the air. Two antennas are shown coupled to radio subcircuit 502: a transmit antenna 504 and a receive antenna 506. Although two antennas are shown herein, both receive and transmit antennas maybe integrated into a single antenna.

Radio interface subcircuit 508 receives packetized data from physical layer framing/transport framing interface subcircuit 510 and formats the downlink data into bursts for transmission to radio subcircuit 502, along with the frequency and power information for the burst. In one embodiment the frequency information itself is recovered from a Global Positioning System (GPS) terminal and synchronized to the proper specification (e.g., GSM specification) using timing phase locked loop (PLL) subcircuit 512. On the receive side, radio interface subcircuit 508 takes the demodulated data out of receive antenna 506 and packetizes it for transmission to the CTRX via the daisy-chain transmission medium 518 (which may implement, for example, the El protocol). In one embodiment, radio interface subcircuit 508 is implemented using a field programmable gate array (FPGA). Digital Signal Processing (DSP) subcircuit 514 performs the modulation of the binary signals received from the cellular network for transmission via transmit antenna 504, demodulation of the RF signal received via receive antenna 506, as well as signal equalization. In one embodiment, DSP subcircuit 514 is implemented by a general purpose Digital Signal Processor (DSP).

A read-only memory subcircuit 520 stores configuration data for configuring RTRX 402 upon start up. Microcontroller 522 provides house-keeping functions such as status checks, diagnostics, and power management. In one embodiment, microcontroller 522 may be employed to take the RTRX 110a out of the daisy-chained loop if the RTRX is found to be defective, e.g., by connecting the input and output of the RTRX together. Microcontroller 552 also oversees the communication between the RTRX and its CTRX counterpart. In one embodiment, all communication between the RTRX and the CTRX is performed via the physical layer framing/transport framing interface subcircuit 510. Physical layer framing/transport framing interface subcircuit 510 performs the tasks of formatting and driving data to the CBTS, receiving and deformatting data received from the CBTS, and supervising, controlling and monitoring the health of the connection.

The division of labor between the RTRX and the CTRX may be better understood with reference to the exemplary implementations of FIGS. 9 and 10A–C. FIG. 9 is a block diagram illustration of the data flow within a prior art GSM BTS module during transmit and receive. Data to be transmitted to the mobile stations is received from the BSC via an Abis interface 602. Speech De-framing block 604 extracts the digital data from the Abis frame and passes it to Channel Coding block 606, whose purpose is to package the extracted digital data for eventual transmission over the RF medium. The data is then interleaved on a multiplicity of bursts to minimize the risk of losing consecutive bits during transmission in Interleaving block 608. The bursts are then formatted in Burst Formatting block 610 and optionally ciphered for security in Cipher block 612. Thereafter, the digital data is modulated (e.g., using Gaussian Minimum-Shift Keying) for transmission to the mobile station as RF signals via Tx Radio block 616.

On the receive side, RF signals from the mobile stations are received at RxRadio block 650, and demodulated into digital data and equalized in Demodulation/Equalization block 652. Deciphering, if any, is performed in Deciphering block 654. Burst Formatting block 656 extracts user data and from the speech frame and builds it with the appropriated midamble into a 148 bit burst.

Thereafter, De-Interleaving block 658 reassembles the data from groups of bursts. The digital data is then stripped using Channel Decoding block 660 to extract the user data.

Speech Framing block 662 frames the stripped digital data into Abis frames for transmission to the BSC. The functional blocks of FIG. 9 are well known to those skilled in the GSM art. As mentioned, circuitry necessary for implementing the functional blocks of FIG. 9 are typically implemented in one box in the prior art, i.e., these circuits are co-resident in the prior art BTS.

To contrast, FIG. 10A illustrates, in accordance with one embodiment of the invention, the data flow within the inventive CBTS during transmit and receive. In FIG. 10A, Abis interface block 602, as well as blocks 604, 606, 608, 610 and 612 on the downlink path and blocks 654, 656, 658, 660 and 662 in the uplink path perform substantially the same functions as corresponding blocks in FIG. 9. To facilitate remote communication between the CTRX and the RTRX, additional physical layer framing and transport framing functional blocks are added. On the transmit side, these are shown as transport framing interface blocks 702 and 708, with transport framing interface block 702 being co-resident with the CBTS and its counterpart transport framing interface block 708 being implemented in the RTRX. The transport framing may employ the well known ATM protocol, IP protocol or Frame Relay protocol, as mentioned earlier.

Also on the transmit side, physical layer framing for communication between the RTRX and the CTRX is implemented via physical layer framing interface blocks 704 and 706, with physical layer framing interface block 704 being co-resident with the CBTS and its counterpart physical layer framing interface block 706 being implemented in the RTRX. In one embodiment, as the ciphered digital data is output from Cipher block 612, it is packetized into ATM or IP frames (block 702) and framed for transmission via the El protocol (block 704). This data is transmitted to the RTRX via the transport link 710. Upon receiving the data, the RTRX extracts the data from the El frame (block 706) and de-packetizes the data (block 708). The de-packetized data is then modulated (block 614) and transmitted out to the mobile stations via transmit radio block 616.

Note that line 720 signifies the demarcation between the functional blocks implemented in the RTRX and those implemented in the CBTS/CTRX. In practice, the functional blocks above line 720 in FIG. 10A will be implemented in a single CBTS/CTRX box (and even on the same backplane in some cases), while the functional blocks below line 720 are implemented in the RTRX, which is typically located some distance away from the CBTS/CTRX. This structure is in contrast to the prior art BTS of FIG. 9 where all the major blocks shown are co-resident with the BTS.

On the receive side of FIG. 10A, RF signals from the mobile stations are received by Rx radio block 650 and demodulated into digital data in Demodulation/Equalization block 652. The demodulated data, as well as the RF quality data obtained in the equalization process is then transmitted to the CTRX via transport framing interface blocks 760 and 766. Again, physical layer framing interface blocks 762 and 764 are provided to facilitate framing of the demodulated data for transmission via the physical layer protocol. If multiple RTRXs are provided in an antenna diversity application, for example, optional RF quality selection block 768 may be employed to select among the RTRXs one which offers the best transmission quality. Note that this selection may be performed prior to any transmission of user data, e.g., as the called mobile station answers a page from the network. Thereafter, data from the selected RTRX is deciphered (if desired), formatted, de-interleaved, channel decoded, and framed via blocks 654, 656, 658, 660 and 662 in the manner discussed in connection with FIG. 9 prior to being transmitted to the BSC via Abis interface block 602.

Although the division between the RTRX and the CTRX occurs in between the ciphering and modulation blocks in the transmit direction and the deciphering and demodulation/equalization blocks in the receive direction, such is not a limitation of the invention. In fact, it is contemplated that the split between the remote and CTRXs may occur anywhere in the transmit and receive paths. FIG. 10B illustrates one exemplary application wherein the split between the remote and CTRXs occurs between other blocks of the BTS. In FIG. 10B, the split occurs between the speech de-framing and channel coding blocks in the transmit path and between the speech framing and channel decoding blocks in the receive paths. Of course the split may take place between any other blocks if desired.

Note also that it is not necessary that the split between the RTRX and CTRX be symmetrical in the transmit and receive paths. FIG. 10C illustrates one exemplary implementation where the split is asymmetrical such that there is more transmit path circuitry in the CTRX than there is receive path circuitry. Again, the exact locations in the transmit and receive paths where the RTRX and CTRX may be split are implementation specific.

B. Network Functions

The inventive architecture and components allows the invention to perform many functions that serve to improve cellular call processing and routing. The cellular network designer can design the RTRXs so that they are placed in positions for maximum and flexible coverage. Some of the RTRXs will be placed in locations that are believed to have a high number of mobile stations and others will be placed in location that are believed to have a low number of mobile stations. When the network is activated, the mobile stations will move in the space and network activity will vary. Some of the novel functions described below are designed to ameliorate the problems associated with varying network activity and to accommodate the anticipated increased activity of the network.

1) Frequency Hopping Across RTRXs

Often, the RTRXs will be located close to one another such that the mobile stations can access more than one RTRX, if necessary. This aspect of the invention involves each of the RTRXs broadcasting the beacon for a fraction of the time, such as ¼ of the time, rather than all the time. When the mobile station goes off-hook, the RTRX that is outputting the beacon frequency will identify the off-hook mobile and begin a session with that mobile station. The RTRX will inquire from the MSC whether the mobile station is authenticated, and then the MSC will instruct the RTRX to assign the mobile to a particular frequency (and possibly a frequency hop sequence). The mobile will then begin communicating as instructed by the RTRX.

When another mobile station goes off-hook, the beacon frequency may be emanating from a different RTRX and the mobile station would be assigned to that RTRX. This unloads the call initiation complexity onto multiple RTRXs in order to distribute the call load among the RTRXs. As a result, the network provides improved frequency diversity, improved coverages, and improved quality of service.

2) Diversity Receive/Transmit

Again, since the RTRXs are often located close to one another such that the mobile stations can access more than one RTRX, one aspect of the invention is that the network performs a diversity function. When a mobile station is transmitting its outbound information, several RTRXs may receive the information. When this occurs, one of the RTRXs will receive a better signal than other RTRXs. The best signal is advantageously received by the best RTRX and that inbound information is reconstructed in the CBTS or the BSC (or even the MSC) in order to capture all the inbound information and compile the information into the complete inbound information.

The diversity function is based on the presumption that the network will occasionally have some excess capacity. When there exists excess capacity, the diversity function can insure that the best-received signal is used to compile the inbound information.

In this aspect of the invention, the outbound information to the mobile station is performed by one of the RTRXs that is assigned to the mobile station. If the mobile station moves to a location where the MSC decides to handoff the mobile station to another RTRX, then the handoff is performed and that newly assigned RTRX will communicate the outbound information to the mobile station.

In an antenna diversity application, each CTRX essentially represents a separate RF channel during use, data from a given mobile station in the cell may be picked up by more than one RTRX. Accordingly, the CTRX preferably includes RF quality selection circuitry 454a for selecting the best RTRX, which has the highest quality reception, so that the selected RTRX may be employed for communication with the mobile station during the call. In the antenna diversity application, since each CTRX and its associated set of RTRXs represents an RF channel at any given time, a mobile station communicating on that channel may be picked up by more than one RTRX. With reference to FIG. 6, for example, RF signals from mobile station 111a may be picked up by the antennas within the set of RTRXs 110c–110e. CTRX 452b includes RF quality selection circuitry 454b for selecting the best RTRX among the set of RTRXs 110c–101e, which offers the best transmission quality. If RTRX 110d is found to offer the best transmission quality, CTRX 452b may employ the antennas within RTRX 110d for subsequent communication with the mobile station 111a. Selection may be made, in one embodiment, by comparing the receive equalizer quality and the Receive Signal Indicator Strength (RSSI) from the various RTRXs and selecting the best from those received. In a TDMA system (GSM) this selection may be done for each TDMA burst.

With reference to FIG. 7, the use of routing circuit 464 advantageously facilitates dynamic DSP assignment of the aggregate cells associated with CTRXs 452a–452c to handle changes in capacity requirements. The dynamic configuration may be accomplished by simply changing the routing table or database that routing circuit 464 uses to route data between the CTRXs and the RTRXs. By way of example, at time TO RTRX 110a may be routed to CTRX 452a, RTRX 110b may be routed to CTRX 452b, and RTRXs 110c–110e may be routed to CTRX 452c. If capacity in the vicinity of RTRXs 110d–110e increases at time T1, either temporarily or permanently, dynamic DSP assignment may be employed to route data from RTRX 110e to its own CTRX 452c, RTRX 110d to its own CTRX 452b, and redistribute the remaining RTRXs 110a–110c to CTRX 452a. Since the area in the vicinity of RTRX 110*d* and the area in the vicinity of RTRX 110*e* do not have to share CTRXs after reconfiguration, more capacity may be handled in these areas. As can be appreciated by those skilled in the art, dynamic DSP assignment substantially simplifies the task of redistributing capacity when RTRXs or CTRXs are added or removed from the CBTS.

In general, there is no limit to the number of CTRXs that may be implemented in a given CBTS. In practice, the number of CTRXs are scaled corresponding to the processing (and routing if the Dynamic DSP Assignment implementation is desired) capabilities of the CBTS. Since each additional CTRX adds an additional RF channel to the BTS, it is desirable to endow CPU 460 of FIGS. 6 and 7 with sufficient processing capabilities to ensure that all calls are properly handled. By way of example, in one non-antenna diversity application, each remote radio may provide one GSM frequency channel (8 traffic channels). Depending on the design of the CTRX, one CTRX can process any number of RTRXs (around 8 to 16 in one example). In some embodiments, parallel processing techniques may be employed to enable the CBTS to handle a large number of CTRXs. Such CPU scaling exercise is within the skills of those skilled in the art given this disclosure.

3) Soft Handoff

In the diversity receive/transmit aspect of the invention, a soft handoff can be performed. This is performed when the receive level at the assigned RTRX drops below a predetermined threshold. When such a drop occurs, the mobile station can be assigned to a second RTRX that is receiving a stronger signal. In this case, the second RTRX is likely the RTRX that has been communicating the inbound information from the mobile to the MSC for several recent frames in the diversity function.

To accomplish a soft handoff, the CBTS, BSC and MSC are configured to determine when the inbound information power level to the RTRX drops below a predetermined threshold. The threshold may be measured in Watts, but could also be measured in relative strength compared to a neighboring RTRX.

4) Simulcast

This aspect of the invention involves simultaneously transmitting outbound information from a plurality of RTRXs. This can be considered a broadcast where the coverage of the broadcast includes the cells where the RTRXs are identified to transmit the outbound information. This aspect of the invention is advantageous for communicating to a plurality of mobile stations simultaneously to make an announcement concerning all mobile stations. For example, if the network is located at an airport, the simulcast may include flight information or other information relevant to many of the mobile stations. This is called Cell Broadcast which is already an ETSI feature.

Additionally, simulcast can be performed intelligently by dynamically allocating simulcast function to the RTRXs on a bust by burst basis. For example, if each burst frame has the capability to support 8 mobile stations and only 8 mobile stations are active, then each of the RTRXs in the proximity to the 8 mobile stations will simulcast the outbound signal. However, if an additional mobile station goes off-hook, then one of the simulcast bursts for each of the RTRXs in the proximity to the 9 mobile stations is dynamically reconfigured so that one of the RTRXs will communicate with the 8th mobile station and another of the RTRXs will communicate with the 9th mobile station while continuing to simulcast to the 1st through 7th mobile stations.

One problem that may arise in simulcast techniques is that of nulls. Nulls are locations where the outbound signals from the RTRXs cause destructive interference with respect to one another resulting in zero power at that location. To alleviate this problem, the nulls can be periodically moved in space so that no mobile station experiences a sustained null. Techniques for moving nulls include power hopping where the radiated power of the RTRXs is periodically varied, frequency hopping where the communication frequency is periodically varied, and clock dithering where the timing clock is periodically varied.

5) Mix and Match Frequency Spectrum Standards

In recognition of the variety of communication standards, the invention can employ RTRXs that can communicate under various standards. The defined interface between the CBTS and the RTRX can remain as described in this specification, but the defined interface between the RTRX and the mobile stations can vary. For example, one type of RTRX can be constructed to communicate with mobile stations that employ the 1800 MHz GSM standard, another type can be constructed to communicate with mobile stations that employ the 1900 MHz GSM standard, another type can be constructed to communicate with mobile stations that employ the 900 MHz GSM standard, while other types can be constructed to communicate with mobile stations than employ other standards such as CDMA, AMPS, digital AMPS and others.

6) Inter-BTS Handovers

One feature of the invention that is understood from the consideration of installing the network at a large facility is that many times the callers will be calling one another within the network. This makes sense considering that a field technician may want to communicate with his supervisor or other technicians before taking an action that might affect other services. In this case, the technician will be calling within the network. Several other similar cases are readily apparent to those skilled in the art. In this aspect of the invention, the call is switched in the private network in order complete the call. In this case, the call does not need to be backhauled all the way up to the MSC. This reduction in backhauling the call results in lower overhead and less signaling. To accomplish the switching, a faux signaling step is performed to pretend as though the call was backhauled. This is called a faux Abis, as described in U.S. Pat. No. 5,734,979.

7) Reliability and Quality, Recovery and Fault Tolerance

With a relatively large number of RTRXs and CBTSs, the network demonstrates very good quality, recovery and fault tolerance. For example, since many of the RTRXs can be located close to one another, the operational network components can take over for the faulty components. Then, the faulty component can be repaired without disruption in service.

8) Statistical Based Allocation

Another aspect of the invention relates to a technique for balancing network communication load. In this aspect, if one RTRX becomes heavily burdened with communication traffic, some of the communication is diverted to other neighboring RTRXs that can accept the communication. Referring to FIG. 1, suppose that many mobile stations are gathered in an area close to RTRX 110*c*. RTRX 110*c* will communicate with the mobile stations and will attempt to communicate with every mobile station that goes off hook in that area. However, this will cause RTRX 110*c* to be heavily burdened and will cause the traffic between RTRX 110*c* and CBTS 108*a* to become very heavy. In one technique, some of the mobile stations communicating with RTRX 110*c* are diverted to communicate with RTRX 110*b*. This serves to balance the load on RTRX 110*c*, although the signal quality between the mobile station and RTRX 110b may not be as good as to RTRX 110c. The result is a more optimum communication traffic load that balances the system. In this first technique, the traffic to CBTS 108a is still heavy, so a second technique is described to alleviate that load. In the second technique, preference is given to an RTRX that is coupled to a different CBTS. In this technique, mobile stations would be diverted, for example, to RTRX 110f. This serves the double benefit of unloading some of the traffic from RTRX 110c and CBTS 108a and moving that load to RTRX 110f and CBTS 108c.

In one aspect of the invention based on these techniques, the invention can balance the communication load on a burst by burst basis. The balance can be performed intelligently by dynamically allocating functions to the RTRXs on a bust by burst basis. For example, when mobile stations are concentrated in specific locations serviced by the network, the network acts to balance the communication load by diverting mobile station communication to alternate RTRXs. This allocation can be accomplished on a burst by burst or frame by frame basis.

9) Coverage and Quality Improvement, BSC-BSC Communications

One feature similar to that of the inter-BTS communications is that of BSC-BSC communications. This is advantageous considering that many of the calls are placed within the network. In this aspect of the invention, the call is switched in the private network in order complete the call, and the call does not need to be backhauled all the way up to the MSC. This reduction in backhauling the call results in lower overhead and less signaling. To accomplish the switching, a faux signaling step is performed to pretend as though the call was backhauled. This is called a faux A, as described in U.S. Pat. No. 5,734,979.

10) OMC Functions

The OMC 112 oversees the network. In one aspect of the invention, the OMC includes a network topology memory 206 that includes a map identifying the locations of the network components and the geographic topology. The OMC provides network status information through the user interface 210. The OMC collects statistics including communication load and congestion information. This information is useful for the network planners to adjust the network to accommodate increased mobile stations. This information is also useful for the active network to assign RTRXs to calls and to balance the communication load among RTRXs, as described above.

The OMC can modify the operating parameters of the network so that the network will have different preferences. For example, in a conventional network, the TRX with the greatest reception power level is assigned to the mobile station. The invention allows the operating parameters to be modified to provide a preference given to RTRXs that are not presently communicating with a mobile station, or are communicating with relatively few mobile stations compared to some of the other RTRXs. This modification will tend to balance to communication load in the network.

The OMC also includes event management, alarms and subscriber management. The event management includes the function of identifying network events such as network traffic overload, an error condition indicative of a fault (e.g. a broken component), or other similar event. It can also record interference conditions that occur between the network components and the mobile stations. This information is helpful to allow technicians to either adjust network traffic to accommodate the communication loading, or to identify the error condition or other event for corrective repair. The OMC also serves to execute test and maintenance programs that verify the health of the network.

C. Alternate Architectures

1) Combinations

The architecture depicted in FIG. 1 can be compressed with the combination of components, as described in U.S. Pat. No. 5,734,979. In this aspect if the invention, FIG. 11 depicts how a modular and scalable architecture is implemented with a TDM bus and a VME bus. A chassis 800 provides support for the VME bus 254a and TDM bus 254b along a backplane. Elements, such as CPU 252, are positioned in the chassis to connect to the backplane via a connector, as known in the art. The elements can be constructed on single, double, or more printed circuit boards. The elements define the resulting network component. The CPU 252, DSP 802 and CTRX 804 are coupled to both the VME bus 254a and TDM bus 254b. A clock module 806 is coupled to the TDM bus 254b and generates the reference clock which allows the subsystems to operate in a synchronized fashion. The trunk module 256 is coupled to both the VME bus and the TDM bus. FIG. 11 depicts a one-TRX BTS configuration, which is also depicted in FIG. 12.

FIGS. 12 and 13 depict network components that are constructed from elements connected in the chassis 800. FIG. 12 depicts a CBTS with two CTRXs, an RF distribution card, a CPU and an E1 card. The chassis can operate as a stand alone unit, or can be mounted to an equipment rack for deployment in the field. Moreover, any card can be placed in any slot. It is possible, by removing all CTRXs, to build BSC or MSC configurations using just trunk module and CPU cards.

Since the architecture is fully scalable, FIG. 13 depicts a base station having six TRXs, two CPUs, and three trunk modules. Any base station configuration and function can be accommodated by selecting processing elements for deployment. Various possible functions, such as BTS, BSC, combined BTS/BSC, MSC, combined BSC/MSC, and combined BTS/BSC/MSC can be achieved with the invention. A configuration having a single CTRX and single trunk module is possible when the CPU functions are incorporated in the CTRX processor and trunk module processor.

In order to achieve the collapsing functions, the trunk module 256 is employed to accommodate different information rates. Referring back to FIGS. 5A–B, framers 410, 412 are coupled to time/space switch 402 via 2 Mbps framer ports TxA and TxB. The 2 Mbps is an E1 interface rate, but can be modified for any interface rate. Framers 410, 412 are configured to communicate with other network elements such as a BTS, BSC, MSC, PBX, PSTN, or others. Since the base station can be configured to perform the functions of a BTS, BSC, or MSC, the type of interface may be changed to accommodate the particular required interface function. For example, framers 410, 412 shown in FIG. 7 can interface with an E1 at 2 Mbps, a T1 at 1.544 Mbps, DS0 at 64 Kbps, or other digital interface.

FIG. 15 depicts a network architecture where the BSC and CBTS functions are combined in the same chassis. A chassis configured to perform this network component could have a plurality of CTRXs, a trunk module, a CPU, clock card and an RF distribution card. Routing functions described above for routing calls through the BSC or CBTS are now routed through the BSC/CBTS combination. To accomplish some of these switching techniques the Abis interface is implemented as a faux Abis, as described in U.S. Pat. No. 5,734,979.

FIG. 16 depicts a network architecture where the MSC and BSC functions are combined in the same chassis. A chassis configured to perform this network component could have a trunk module, a CPU and a clock card. Routing functions described above for routing calls through the MSC or BSC are now routed through the MSC/BSC combination. To accomplish some of these switching techniques the A interface is implemented as a faux A, as described in U.S. Pat. No. 5,734,979.

FIG. 17 depicts a network architecture where the MSC, BSC and CBTS functions are combined in the same chassis. A chassis configured to perform this network component could have a plurality of CTRXs, a trunk module, a CPU, a clock card and an RF distribution card. Routing functions described above for routing calls through the CBTS, BSC or MSC are now routed through the MSC/BSC/CBTS combination. To accomplish some of these switching techniques the A interface is implemented as a faux A and the Abis interface is implemented as a faux Abis, as described in U.S. Pat. No. 5,734,979.

A significant advantage of the scalable architecture is that when trunk module cards are added, the switching ability of the base station increases. For example, by configuring a base station with three trunk modules, as shown in FIG. 13, the base station capacity is increased to six E1 output ports. This configuration provides both greater communication capacity to a MSC, as well as greater information switch capacity within the base station itself, such as between CTRX cards.

2) Alternate Communication Architectures

FIG. 18 depicts a ring architecture 900 where the BSC components 106a–16b and the combined BSC/CBTS component 130a comprise a structure to switch information between respective CBTSs 110a–110r and MSC 102 over a bus 904. The bus 904 can be an E1, for example, that transports information to and from the network components using an ATM protocol, IP protocol or Frame Relay protocol. A sub-network is configured with CBTS 108a and 108b by coupling these components to a bus 908 and BSC 106a. This configuration is beneficial because each of the network components has access to other network components that is uses to communicate information between mobile stations in the network and the PSTN 104.

D. Conclusion

The invention provides many advantages over known techniques. One advantage of the invention is a combination of low-cost transceiver and flexible deployment to gain communication coverage over a large area at a low cost. This permits cellular system engineers to design cellular coverage for virtually any physical space. Additional advantages to aspects of the invention include modularity, scalability, distributed processing, improved performance, reduced network congestion, fault tolerance, and more efficient and cost-effective base stations.

In particular, since multiple RTRXs may be coupled to a single CTRX and each CBTS may have a plurality of CTRXs, the inventive architecture offers great flexibility in configuring the cell. Cell shaping is no longer limited to modifying antenna shape and transmit range around the BTS. With the inventive CBTS architecture, cabling can be run from a CTRX to any number of geographically dispersed RTRXs to form an aggregate cell out of the geographically dispersed radio cells. Further, with multiple CTRXs in each CBTS, the service provider has beneficial tools for configuring the cellular network.

These inexpensive low-power RTRXs may now be employed in place of the high power TRX of the prior art to cover the same area. Beside reducing the costs of the radio circuits, the invention also promotes frequency reuse since each radio cell (associated with each RTRX) may be smaller. Also as discussed, the ability to dynamically associate one or more RTRX with a given CTRX offers the service provider great flexibility in reconfiguring the cell to adapt to changes in capacity using the existing set of RTRX/CTRXs or additional RTRX/CTRXs.

Having disclosed exemplary embodiments and the best mode, modifications and variations may be made to the disclosed embodiments while remaining within the scope of the invention as defined by the following claims.

What is claimed is:

1. A cellular network for providing wireless communication with a plurality of mobile stations, comprising:
    a mobile switching center having a public interface configured to communicate with a public switched telephone network and at least one private interface configured to communicate with a private network, said mobile switching center configured to route calls from said public network to said private network and from said private network to said public network;
    a base station controller coupled to said mobile switching center private interface and configured to communicate with said mobile switching center;
    a concentrated base transceiver station coupled to said base station controller and configured to communicate with said base station controller; and
    a plurality of remote transceivers separated from and coupled to said concentrated base transceiver station, each of said plurality of remote transceivers configured to communicate with said concentrated base transceiver station and with said mobile stations; and
    wherein, said concentrated base transceiver station comprises:
        a plurality of central transceivers through which the concentrated base transceiver station communicates with said plurality of remote transceivers; and
        a routing circuit through which each of said plurality of central transceiver is coupled to a unique subset of said plurality of remote transceivers to facilitate dynamic allocation of radio resources based of the concentrated base transceiver station.

2. The cellular network of claim 1, wherein:
    said mobile switching center is further configured to route calls within said private network without communicating with said public network.

3. The cellular network of claim 1, further comprising:
    an operations and maintenance center coupled to said mobile switching center and configured to control said mobile switching center and to monitor said network; and
    a user interface coupled to said operations and maintenance center and configured to display information regarding a status of said cellular network.

4. The cellular network of claim 1, wherein one of said mobile stations is communicating with a first remote transceiver at a first frequency, and wherein:
    said concentrated base transceiver station is configured to instruct said first remote transceiver to instruct said mobile station to switch to a second frequency; and
    said concentrated base transceiver station is configured to instruct a second remote transceiver to hop to said second frequency to communicate with said mobile station.

5. The cellular network of claim 1, wherein one of said mobile stations is communicating with a first remote transceiver at a first frequency, and wherein:

said concentrated base transceiver station is configured to instruct said first remote transceiver to instruct said mobile station to switch to a second frequency; and said concentrated base transceiver station is configured to instruct a second remote transceiver to hop to said second frequency to communicate with said mobile station.

6. The cellular network of claim 1, wherein:

a first remote transceiver receives inbound information from a mobile station;

a second remote transceiver receives inbound information from said mobile station; and a first concentrated base transceiver station coupled to said first remote transceiver;

a second concentrated base transceiver station is coupled to said second remote transceiver;

said base station controller is coupled to said first concentrated base transceiver station and said second concentrated base transceiver station and is configured to determine which of said first remote transceiver and said second remote transceiver is used to communicate said inbound information from said mobile station to said mobile switching center.

7. The cellular network of claim 6, wherein:

said base station controller is configured to determine which of said first remote transceiver and said second remote transceiver is used to communicate said inbound information from said mobile station to said mobile switching center based on a signal strength of said inbound information.

8. The cellular network of claim 6, wherein:

said base station controller is configured to determine which of said first remote transceiver and said second remote transceiver is used to communicate said inbound information from said mobile station to said mobile switching center based on a signal strength of said inbound information, wherein preference is given to the remote transceiver that has previously been receiving inbound information from said mobile station, but is handed off to the other remote transceivers when the signal strength drops below a predetermined threshold.

9. The cellular network of claim 6, wherein:

said base station controller is configured to determine which of said first remote transceiver and said second remote transceiver is used to communicate said inbound information from said mobile station to said mobile switching center based on a load factor of said network.

10. The cellular network of claim 1, wherein:

a plurality of said remote transceivers outbound information.

11. The cellular network of claim 1, wherein:

a plurality of said remote transceivers coupled to a plurality of said concentrated base transceiver stations are configured to simultaneously transmit the same outbound information.

12. The cellular network of claim 1, wherein:

a first of said remote transceiver is configured to communicate with said mobile stations in a first frequency band; and a second of said remote transceiver is configured to communicate with said mobile stations in a second frequency band different from said first frequency band.

13. The cellular network of claim 1, wherein:

said mobile switching center is configured to store a parameter/usage table and to allocate communication frequencies based on said parameter/usage table.

14. The cellular network of claim 13, wherein:

said mobile switching center is configured to update said parameter/usage table based on interference between a first mobile station communicating with a first remote transceiver and a second mobile station communicating with a second remote transceiver.

15. The cellular network of claim 13, wherein:

said mobile switching center is configured to update said parameter/usage table based on usage of said plurality of remote transceivers.

16. The cellular network of claim 1, wherein:

said network is configured to tolerate failures by transferring inbound and outbound information from a failed component to an operational component including:

(a) transferring a mobile station from a failed remote transceiver to an operational remote transceiver;

(b) transferring a mobile station from a failed concentrated base transceiver station/ remote transceiver to an operational concentrated base transceiver station/ remote transceiver; and (c) transferring inbound and outbound information from a failed base station controller to an operational base station controller .

17. The cellular network of claim 1, wherein:

said network is configured to tolerate failures by transferring inbound and outbound information from a failed component to an operational component including:

transferring inbound and outbound information from a failed mobile switching center to an operational mobile switching center.

18. The cellular network of claim 1, wherein:

said network is configured to allocate radio resources based at least in part on a statistical allocation.

19. The cellular network of claim 18, wherein:

said network is configured to allocate radio resources based at least in part on an average geographic allocation, and configured to instruct mobile stations to communicate with remote transceivers in order to load each remote transceiver to an average geographic value.

20. The cellular network of claim 1, wherein the radio resources of said concentrated base transceiver station include said plurality of central transceivers, and wherein said routing circuit is configured to facilitate dynamic assignment of said plurality of central transceivers to said plurality of remote transceivers.

21. A cellular network for providing wireless communication with a plurality of mobile stations, comprising:

a mobile switching center having a public interface configured to communicate with a public switched telephone network and at least one private interface configured to communicate with a private network, said mobile switching center configured to route calls from said public network to said private network and from said private network to said public network;

a base station controller coupled to said mobile switching center private interface and configured to communicate with said mobile switching center;

a concentrated base transceiver station coupled to said base station controller and configured to communicate with said base station controller; and a plurality of remote transceivers separated from and coupled to said concentrated base transceiver station, each of said plurality of remote transceivers configured to communicate with said concentrated base transceiver station and with said mobile stations; and wherein, said concentrated base transceiver station comprises:

a plurality of central transceivers through which said concentrated base transceiver station communicates with said plurality of remote transceivers;

a routing circuit through which each of said plurality of central transceiver is coupled to a unique subset of said plurality of remote transceivers to facilitate dynamic assignment of said plurality of central transceivers to said plurality of remote transceivers; and a plurality of RF quality selection circuits, each of said plurality of RF quality selection circuits associated with one of the plurality of central transceivers, and configured to select from the subset of said plurality of remote transceivers a remote transceiver based on a received signal quality.

22. The cellular network of claim 21, wherein each of the plurality of remote transceivers further include a microcontroller configured to oversee communication between the remote transceiver and its associated central transceiver.

23. The cellular network of claim 21, wherein each of the plurality of remote transceivers is coupled to its associated central transceiver in a daisy-chain arrangement.

24. The cellular network of claim 21, wherein each of the plurality of remote transceivers is coupled to its associated central transceiver in parallel.

* * * * *